US008601748B2

(12) United States Patent
Delago et al.

(10) Patent No.: US 8,601,748 B2
(45) Date of Patent: Dec. 10, 2013

(54) METHOD AND APPARATUS FOR WIND TURBINE ERECTION

(75) Inventors: Pierre Cornelius Delago, Afton, MN (US); Wayne Robert Long, Eagan, MN (US)

(73) Assignee: National Oilwell Varco, L.P., Houston, TX (US)

( * ) Notice: Subject to any disclaimer, the term of this patent is extended or adjusted under 35 U.S.C. 154(b) by 0 days.

(21) Appl. No.: 13/389,173

(22) PCT Filed: Aug. 30, 2010

(86) PCT No.: PCT/US2010/047150
§ 371 (c)(1),
(2), (4) Date: Feb. 6, 2012

(87) PCT Pub. No.: WO2011/031577
PCT Pub. Date: Mar. 17, 2011

(65) Prior Publication Data
US 2012/0131880 A1     May 31, 2012

Related U.S. Application Data

(60) Provisional application No. 61/240,893, filed on Sep. 9, 2009.

(51) Int. Cl.
*E04H 12/34* (2006.01)
(52) U.S. Cl.
USPC .............. 52/123.1; 52/40; 52/119; 52/745.17; 52/745.2
(58) Field of Classification Search
USPC ........... 52/40, 119, 120, 121, 745.03, 745.04, 52/745.2, 123.1, 745.17, 745.18; 212/74, 212/78, 83; 414/10, 11, 12; 416/DIG. 6
See application file for complete search history.

(56) References Cited

U.S. PATENT DOCUMENTS 2,509,717 A * 5/1950 Ausenda ........................ 343/791
2,739,850 A * 3/1956 Hollingsworth ................ 52/121
(Continued)

FOREIGN PATENT DOCUMENTS

EP    0960986 A2    12/1999
EP    1953334 A2    8/2008
(Continued)

OTHER PUBLICATIONS

PCT International Search report for counterpart PCT Patent Application No. PCT/US2010/047150, date Apr. 28, 2011, 2 pages.

*Primary Examiner* — Robert Canfield
*Assistant Examiner* — Matthew Gitlin
(74) *Attorney, Agent, or Firm* — The JL Salazar Law Firm

(57) ABSTRACT

A wind turbine system erection apparatus may include a body portion having a window, a section handler secured to the body portion and extending through the window, the section handler adapted to pick, lift, axis-align, and set a mast section, and a movement mechanism secured to the body portion, the movement mechanism adapted to moveably reposition the body portion along the length of the mast of the wind turbine system. A method is also disclosed and may include positioning an erection apparatus near a base of a mast of the wind turbine system, the positioning including locating the erection apparatus substantially concentrically with the mast. The method may also include picking a mast section from near the base of the system with the erection apparatus, lifting the mast section along the length of the mast, and translating the mast section into the erection apparatus and into alignment with the mast.

14 Claims, 26 Drawing Sheets

(56) References Cited

U.S. PATENT DOCUMENTS

| | | | |
|---|---|---|---|
| 2,991,852 A * | 7/1961 | Lee | 52/118 |
| 3,789,565 A * | 2/1974 | Lindholm | 52/745.01 |
| 4,272,929 A * | 6/1981 | Hanson | 52/40 |
| 4,311,434 A | 1/1982 | Abe | |
| 5,109,953 A | 5/1992 | Mathis | |
| 5,247,776 A * | 9/1993 | Tamayo | 52/745.17 |
| 6,357,549 B1 | 3/2002 | Brennan et al. | |
| 6,522,025 B2 * | 2/2003 | Willis et al. | 290/55 |
| 6,868,646 B1 * | 3/2005 | Perina | 52/745.17 |
| 7,112,010 B1 | 9/2006 | Geiger | |
| 7,160,085 B2 | 1/2007 | de Roest | |
| 7,234,409 B2 | 6/2007 | Hansen | |
| 7,456,515 B2 | 11/2008 | Nielsen | |
| 7,739,843 B2 | 6/2010 | Cortina-Cordero | |
| 7,770,343 B2 | 8/2010 | Montaner Fraguet et al. | |
| 8,011,098 B2 * | 9/2011 | Vorhies et al. | 29/889.2 |
| 8,201,787 B2 * | 6/2012 | Ingram et al. | 248/218.4 |
| 2002/0171247 A1 | 11/2002 | Willis et al. | |
| 2004/0042876 A1 | 3/2004 | Seegers et al. | |
| 2005/0129504 A1 | 6/2005 | De Roest | |
| 2006/0156681 A1 | 7/2006 | Fernandez Gomez et al. | |
| 2007/0296220 A1 | 12/2007 | Kristensen | |
| 2008/0164064 A1 | 7/2008 | Belik et al. | |
| 2009/0026304 A1 | 1/2009 | Yu et al. | |
| 2009/0028647 A1 | 1/2009 | Bingham et al. | |
| 2009/0087311 A1 | 4/2009 | Wyborn | |
| 2010/0071301 A1 | 3/2010 | Herrius de Roest | |
| 2010/0257797 A1 * | 10/2010 | Gomez et al. | 52/294 |
| 2011/0088723 A1 * | 4/2011 | Jensen et al. | 134/18 |

FOREIGN PATENT DOCUMENTS

| | | | |
|---|---|---|---|
| EP | 1956234 A2 | 8/2008 | |
| JP | 2001254668 A * | 9/2001 | F03D 11/04 |
| JP | 2004084322 | 3/2004 | |
| KR | 10-0798083 B1 | 1/2008 | |
| WO | 01/34977 A1 | 5/2001 | |
| WO | 03/093584 A1 | 11/2003 | |
| WO | 2008/084971 A1 | 7/2008 | |
| WO | 2009/105836 A1 | 9/2009 | |
| WO | 2011/031346 | 3/2011 | |
| WO | 2011/031347 | 3/2011 | |
| WO | 2011/031348 | 3/2011 | |
| WO | 2011/031577 A2 | 3/2011 | |

\* cited by examiner

METHOD AND APPARATUS FOR WIND TURBINE ERECTION

CROSS REFERENCE TO RELATED APPLICATION

This application claims the benefit of U.S. Provisional Application No. 61/240,893 filed Sep. 9, 2009, the entire contents of which is hereby incorporated by reference.

FIELD OF THE INVENTION

The present disclosure relates to the construction of towers. More particularly, the present disclosure relates to equipment for constructing towers. Still more particularly, the present disclosure relates to equipment for constructing masts for supporting wind turbines.

BACKGROUND

Wind has become a prominent source of energy in the United States and around the world. A common system for harnessing wind energy includes a wind turbine mounted atop a vertical support. The systems may be installed on land or offshore and the construction of these common systems may become relatively expensive.

One expense relating to the construction of these systems includes a crane. Current systems are often constructed using a large crane. The crane is used to pick and set all, or portions, of the vertical support on a previously installed foundation. Once the vertical support is installed, the generator may be picked up by the crane and lifted to the top of the tower, placed on the tower, and secured.

The costs of maintaining a crane on site throughout construction may be very expensive. Moreover, the size of the wind turbine may often be limited by the lifting capacity of mobile cranes. In the case of offshore construction, the cost of keeping a crane onsite throughout the construction process may become exceedingly expensive.

One solution to minimizing or reducing crane usage is found in U.S. Pat. No. 6,357,549 to Brennan et al. Here, a guide rail system is used to erect towers, to place equipment on towers, and for maintenance of towers. However, the use of a guide rail system may be cumbersome or problematic for several reasons. A portion of the rail needs to be included on each section of the tower. Also, the several portions of the rail need to be fitted and aligned during erection of the tower. Further, the guide rail may be thought to have poor aesthetics and difficulties may be associated with maintaining and painting the intricate rail.

There is a need in the art for an apparatus and method of installing wind energy generation systems where the reliance on an onsite crane is minimized or reduced and the problems associated with a guide rail system are also minimized or reduced.

SUMMARY

In one embodiment, a wind turbine system erection apparatus may include a body portion with a window, a section handler secured to the body portion and extending through the window, the section handler adapted to pick, lift, axis-align, and set a mast section, and a movement mechanism secured to the body portion, the movement mechanism adapted to moveably reposition the body portion along a length of a mast of the wind turbine system.

In another embodiment, an apparatus for elevating a wind turbine on a mast formed in sections may include a frame for surrounding the mast, said frame having a section insertion window. The apparatus may also include a progressive lifting mechanism, such as two or more tensioners or a telecoping frame set using a rack and pinion system or jacking cylinders, to progressively raise the section insertion window. The apparatus may also include a support on the frame for receiving and holding a wind turbine nacelle above the insertion window and a winching arrangement operably connected to the frame for handling consecutive sections of the mast. The apparatus may also include an insertion transporter operably connected to the frame for transversely moving a section of the mast that has been lifted from a point below the insertion window into the frame space and into alignment with the mast. The apparatus may also include a section delivery platform, such as a turntable for moving the next section into position for lifting.

In another embodiment, a method of erecting a wind turbine system may include positioning an erection apparatus near a base of a mast of the system, the positioning including locating the erection apparatus to substantially encircle the mast. The method may also include picking a mast section from near the base of the system with the erection apparatus, lifting the mast section along the length of the mast, and translating the mast section into the erection apparatus and into alignment with the mast.

DETAILED DESCRIPTION

Overview. The present disclosure relates to an erection apparatus for use in constructing wind turbine systems. The apparatus may take the place of onsite cranes previously used to erect wind turbine systems. The apparatus may be positioned near the base of the wind turbine system and may be used to construct a mast of the system. The apparatus may climb the mast as the mast is constructed and it may also carry the wind turbine as it climbs. Once the mast is constructed, the system may set the wind turbine atop the mast and the apparatus may climb back down the mast, where it may be removed from the mast.

Figure 1:
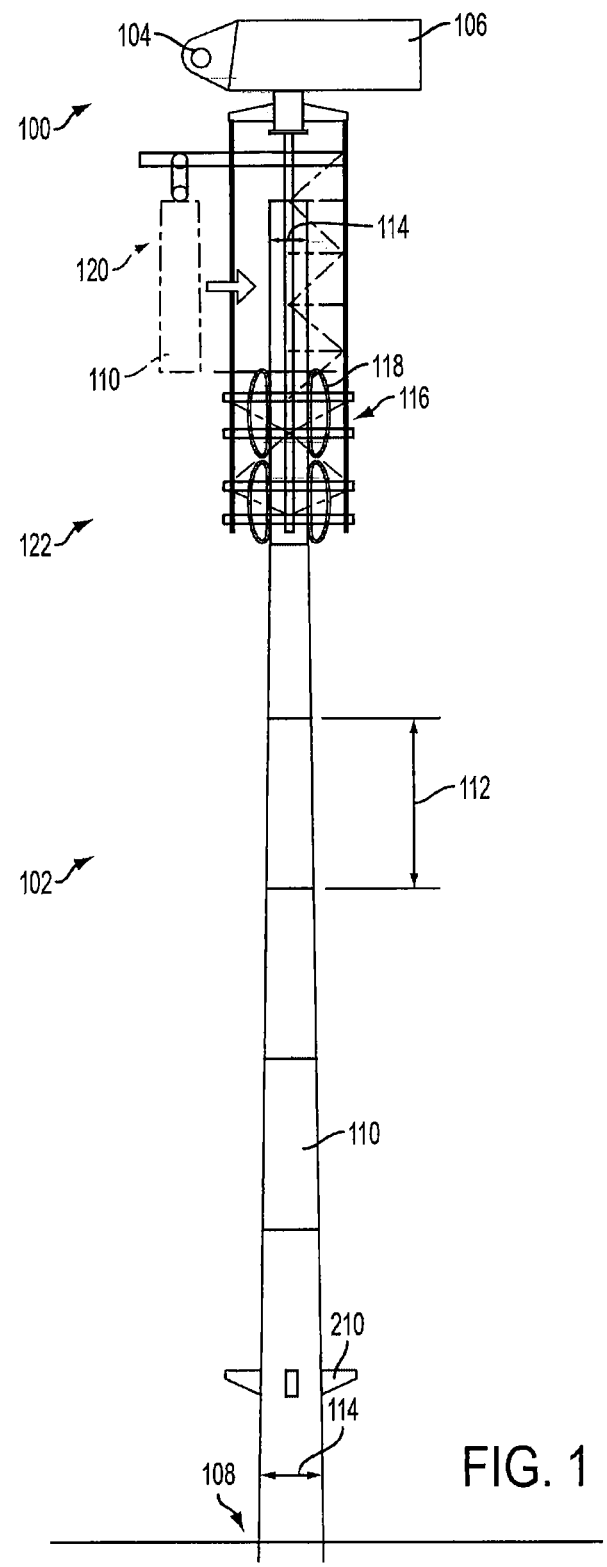
FIG. 1 is a side view of a wind turbine system with an erection apparatus positioned near the top of the wind turbine system.

Referring now to FIG. 1, the wind turbine system may include an energy generator 100 and a support 102. Regarding the energy generator 100, a moveable rotor 104 (blades not shown) and a nacelle 106 may be provided. The rotor 104 may be adapted to rotate due to the forces of wind and the nacelle 106 may contain energy generating components as well as controls for the rotor 104. Regarding the support 102, this portion of the system may be placed on a base 108 (which may be on land or off-shore) and may extend from the base 108 to support the energy generator 100. The support 102 may be a single piece or it may be constructed from a series of sections. The sections may be placed consecutively to form the support 102.

With continued reference to FIG. 1, the support 102 may be in the form of a mast and may extend vertically in the form of a vertical tower. Alternatively, the mast may extend in any direction to separate the energy generator 100 from the base 108, allowing rotation of the rotor 104. The mast may be cylindrically shaped or it may have an oval or other alternative cross-section. The mast may be a continuous piece or it may be constructed from a series of mast sections 110 in the form of cylindrical cans or tubes. The mast sections 110 may have a uniform or varying cross-section and the several sections may have a uniform or varying length 112. In a preferred embodiment, the sections 110 may all be the same length ranging from approximately 25 m to less than 1 m. Preferably, the sections may be 15 m long. As shown, the cross-section of the mast may vary from top to bottom. In a preferred embodiment, the portion of the mast near the base may have a diameter 114 ranging from approximately 10 m to approximately 1 m. Preferably, the diameter 114 near the base is approximately 5 m. The portion of the mast near the energy generator 100 may have a diameter 114 ranging from approximately 8 m to approximately 1 m. Preferably, the diameter 114 near the energy generator 100 is approximately 3 m. The mast sections 110 may vary in cross-section to accommodate the overall mast shape and create a smooth transition between varying sizes. The smooth transition may, for example, create a linear transition between the diameter 114 at the base of the diameter 114 near the energy generator 100. Alternatively or additionally, the smooth transition may be curvilinear. In yet another alternative, the mast may have stepped shape where transitions between varying cross-sections are more abrupt.

Crawler Type System

With the wind turbine system described, a first embodiment of the erection apparatus of the present disclosure may now be described with respect thereto. As shown in FIG. 1, the erection apparatus 122 may include a body portion, a movement mechanism, and a section handler. More particularly, the body portion may be in the form of a frame 116, the movement mechanism may be in the form of a crawling device 118, and the section handler may be a section inserter 120. The crawling device 118 may be secured to the frame 116 and configured to move the frame 116 along the mast and the section inserter 120 may be positioned on the frame 116 and configured to pick, lift, and align mast sections 110 with a previously positioned portion of the mast. Accordingly, the erection apparatus 122 may be adapted to surround the mast and climb the mast as it constructs additional sections of the mast.

Figures 2, 3:
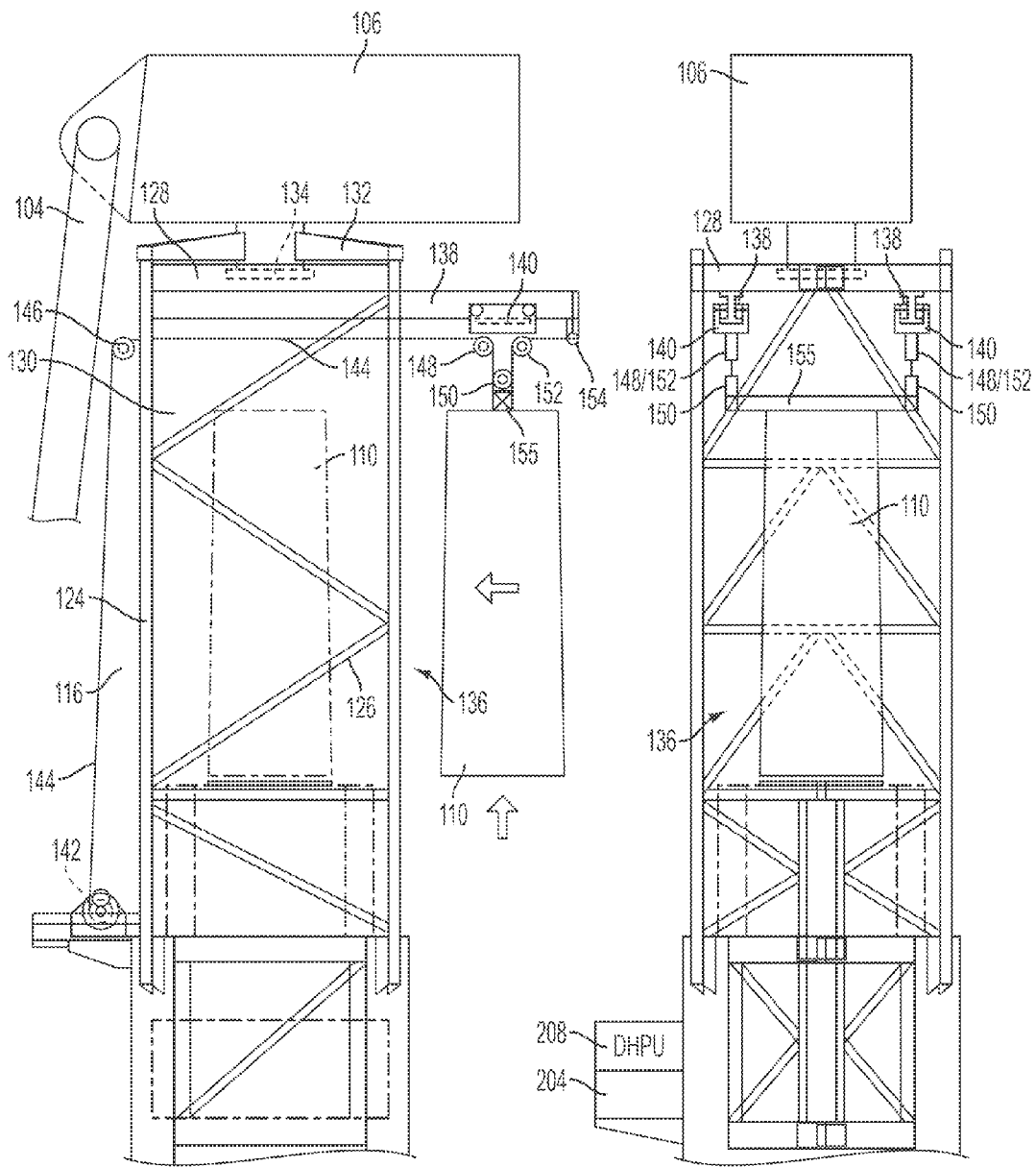
FIG. 2 is a close-up view of a side of the erection apparatus thereof positioned near the bottom of the wind turbine system.
FIG. 3 is a front view of the apparatus of FIG. 2.

Body Portion. Referring now to FIG. 2, the body portion may be in the form of a frame 116 adapted to surround and move along the mast. Alternatively or additionally, the body portion may be in the form of a shell or other structure. As shown, the frame 116 may include a plurality of longitudinal members 124 extending generally parallel to the direction of the extending mast. The longitudinal members 124 may be connected, as shown, by a plurality of lattice members 126. The longitudinal members 124 may be positioned around and offset from the perimeter of the mast, and lattice members 126 may extend between adjacent longitudinal members 124 forming the surrounding frame 116. The frame 116 may be rectangular or an alternative surrounding shape may be used such as for example, round, triangular, hexagonal, pentagonal, etc. In the case of a rectangular frame, in one embodiment, the diagonal dimension 115 shown in FIG. 6 may be approximately 5-10 m, preferably 7.4 m. For the straight or side dimension 117, it may be 3-8 m, preferably 5.25 m. Other frame sizes may be used including sizes outside the range mentioned.

The frame 116 may have an upper, generator end and a lower, mast end. The generator end may include one or more cross members 128 for supporting the section handler. As shown, the cross members 128 may extend perpendicular to the longitudinal members 124 and may extend from one longitudinal member 124 to an adjacent longitudinal member 124. Additionally or alternatively, the cross members 128 may extend to other longitudinal members and may extend across the frame space 130 to an opposing longitudinal member 124.

The frame 116 may also include a generator support 132 positioned on the generator end of the frame 116. The generator support 132 may include a series of radially extending members adapted to support the generator 100 at or near the slew bearing 134. The radially extending members may extend from a longitudinal member 124 radially inward and be connected to the pedestal portion of the nacelle 106 immediately above the slew bearing 134. In some embodiments, a collar may be provided that encircles the pedestal portion of the nacelle 106 immediately above the slew bearing 134. As such, the nacelle 106 and rotor assembly 104 may be positioned at the generator end of the frame 116 and may be affixed thereto. Alternatively or additionally, the slew bearing 134 may be bolted or pinned to a connection plate positioned near the top of the frame 116. In yet another alternative, the slew bearing 134 may be bolted to a stub of the mast and the stub of the mast may be attached to the frame in one of the ways mentioned above. Other support connections for the nacelle may be included, such as clamps.

Figure 4:
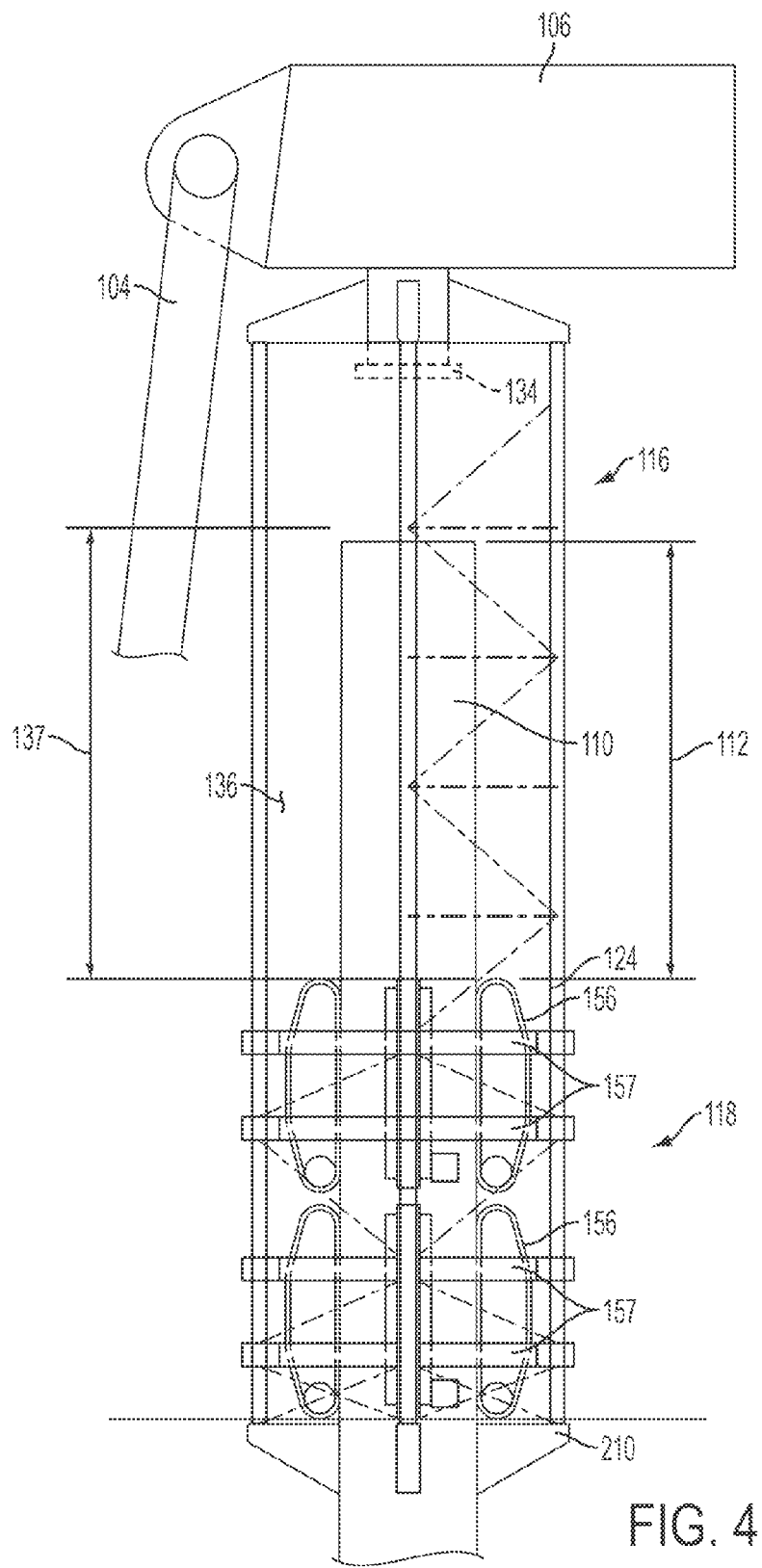
FIG. 4 is an additional close-up view of the erection apparatus of FIG. 1, positioned near the bottom of the wind turbine system.

Referring also to FIGS. 3-4, the frame 116 may include a window 136 on a front side adapted to receive a section 110 of the mast. The window 136 may be an opening in the frame 116, sized to receive a mast section 110 and as such, may have a height 137 at least slightly larger than the section length 112 and a width at least slightly larger than the section diameter 114. Preferably the height 137 ranges from approximately 10-20 m, more preferably 15.5 m. Other heights may be used including heights outside the range mentioned.

Section Handler. Referring again to FIG. 2, the section handler may be in the form of a boom 138 positioned at and secured to the generator end of the frame 116. Alternatively or additionally, the section handler may take the form of a conveyor type system or other material handling system. As shown, the boom 138, together with additional portions of the section handler may be configured to pick mast sections from a resting location, lift the sections along the mast, and align the mast section with previously set portions of the mast by pulling or translating the lifted mast section within the frame 116. The boom 138 may be affixed to the cross members 128 of the frame 116 and may extend from one side of the frame 116, across the frame space 130, and beyond the opposing side of the frame 116. The boom 138 may be connected to the face of the cross members 128 on opposite sides of the generator end of the frame 116 and the boom 138 may be oriented to extend out of the window 136. The boom 138 may include a trolley 140 adapted to track along the boom 138.

The boom 138 may be an I-shaped member including a top and bottom flange and a web extending vertically therebetween. The boom 138 may be adapted to moveably support a trolley 140 positioned on the lower flange. As such, the trolley 140 may be a U-shaped member positioned over the bottom flange with wheels positioned on the top surface of the bottom flange and adapted to roll along the length of the boom 138. The trolley position may be controlled by a motor within the trolley 140 that drives the wheels of the trolley 140 or the trolley position may be controlled with a looping chain and sprocket system where movement of the chain in a first direction causes translation of the trolley 140 along the boom 138 in that direction and where movement of the chain in a second direction causes translation of the trolley 140 along the boom 138 in the second direction. Other trolley translation systems may be used.

The section handler may also include a pulley system adapted to lift and reposition the mast sections 110. The pulley system may include a winch hoist 142 positioned at and secured to the frame 116. In one embodiment as shown, the hoist 142 may be secured to the lower, mast end of the frame 116. Other winch hoist 142 locations may be provided. The winch hoist 142 may include a winch cable 144 that extends from the winch hoist 142 along the length of the frame 116 to a directional pulley 146. The cable 144 may extend around the directional pulley 146 changing the direction of the cable 144 from generally parallel to the frame 116 to generally transverse to the frame 116. The cable 144 may then extend generally transversely to the frame 116 and generally parallel to the boom 138 to a first trolley pulley 148, down to a picking pulley 150, and back up to a second trolley pulley 152. The cable may then extend to an anchor point 154 at the end of the boom 138.

As shown in FIG. 2, the hoist 142 may be actuated to release cable 144 or to gather cable 144. For any given trolley position, when the hoist 142 is releasing cable 144, the picking pulley 150 may drop away from the first and second trolley pulleys 148, 152 allowing the picking pulley 150 to proceed downward. When the hoist 142 is gathering cable 144, again for any given trolley position, the picking pulley 150 may translate toward the first and second trolley pulleys 148, 152.

As shown in FIG. 3, one or more boom 138, trolley 140, and pulley assemblies 148, 150, 152 may be provided. As shown, two generally parallel assemblies are provided, each with its own hoist. In this embodiment, the picking pulleys 150 may be connected by a picking bar 155 adapted to support the weight of a mast section 110.

Movement Mechanism. Referring now to FIG. 4, in one embodiment the movement mechanism may be in the form of one or more crawling devices 156 as shown. Additionally or alternatively, the movement mechanism may be in the form of a relative translation system similar to that described below or a stepping system where the mechanism would climb the mast similar to a human climbing a ladder. Additional alternatives may include a grab and slide type system where the mechanism would reach to a coupling point on the mast and pull or push the body portion relative to the coupling point and then repeat by reaching to a new coupling point. Other movement mechanisms may be provided that allow for translation of the body portion relative to the mast. As shown, the crawling devices 156 may be mounted to an inner surface of the frame 116 and may be adapted to collectively grasp the mast between them and move along the surface of the mast, thereby moving the body portion along the length of the mast. At the location of the movement mechanism, the frame 116 may include one or more tension strap members 157. As shown, in the preferred embodiment, a set of two tension strap members 157 may be positioned to correspond to the location of a given level of crawling devices 156. Accordingly, as the crawling devices 156 press inward against the mast and, as such, tend toward an outward movement, the tension strap members 157 provide a circumferential resistance against which the crawling devices 156 may press.

Figure 5:
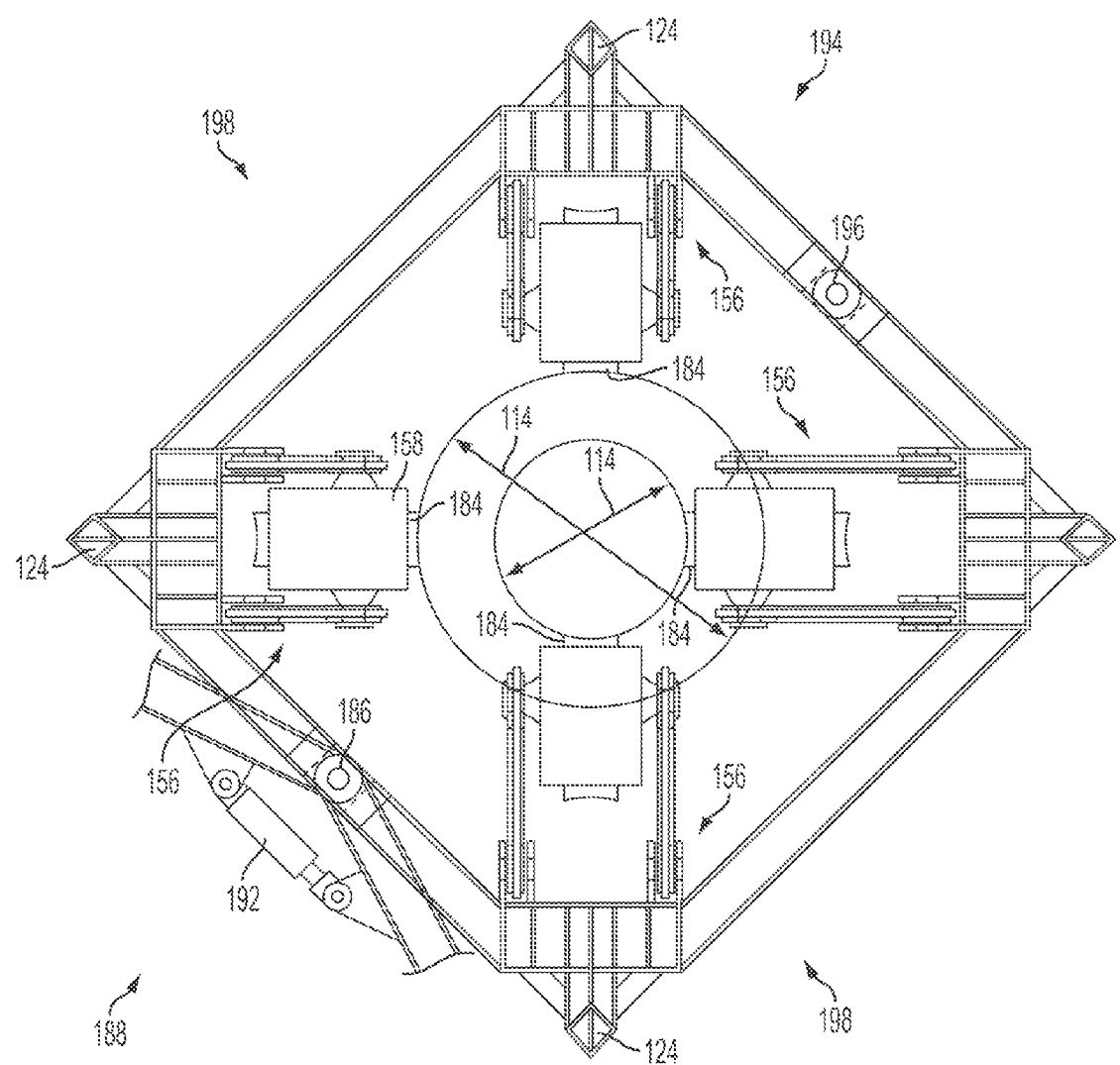
FIG. 5 is a top view of the erection apparatus of FIG. 1.

The movement mechanism may include crawling devices 156 in a single level or in multiple levels as shown. Each given level may include as few as two opposed crawling devices 156 and may include as many as three, four or more crawling devices 156. The devices 156 may be arranged around the perimeter of the mast in an array corresponding to the cross sectional shape of the mast. As shown, the devices 156 may be arranged in a radial array corresponding to the cylindrical shape of the mast. In some embodiments, as shown in FIG. 5, the number and arrangement of the crawling devices 156 may correspond to the number and location of the longitudinal members 124 of the frame. In other embodiments, the number and location of the crawling devices 156 does not correspond to the number and location of the longitudinal members 124.

Figure 6:
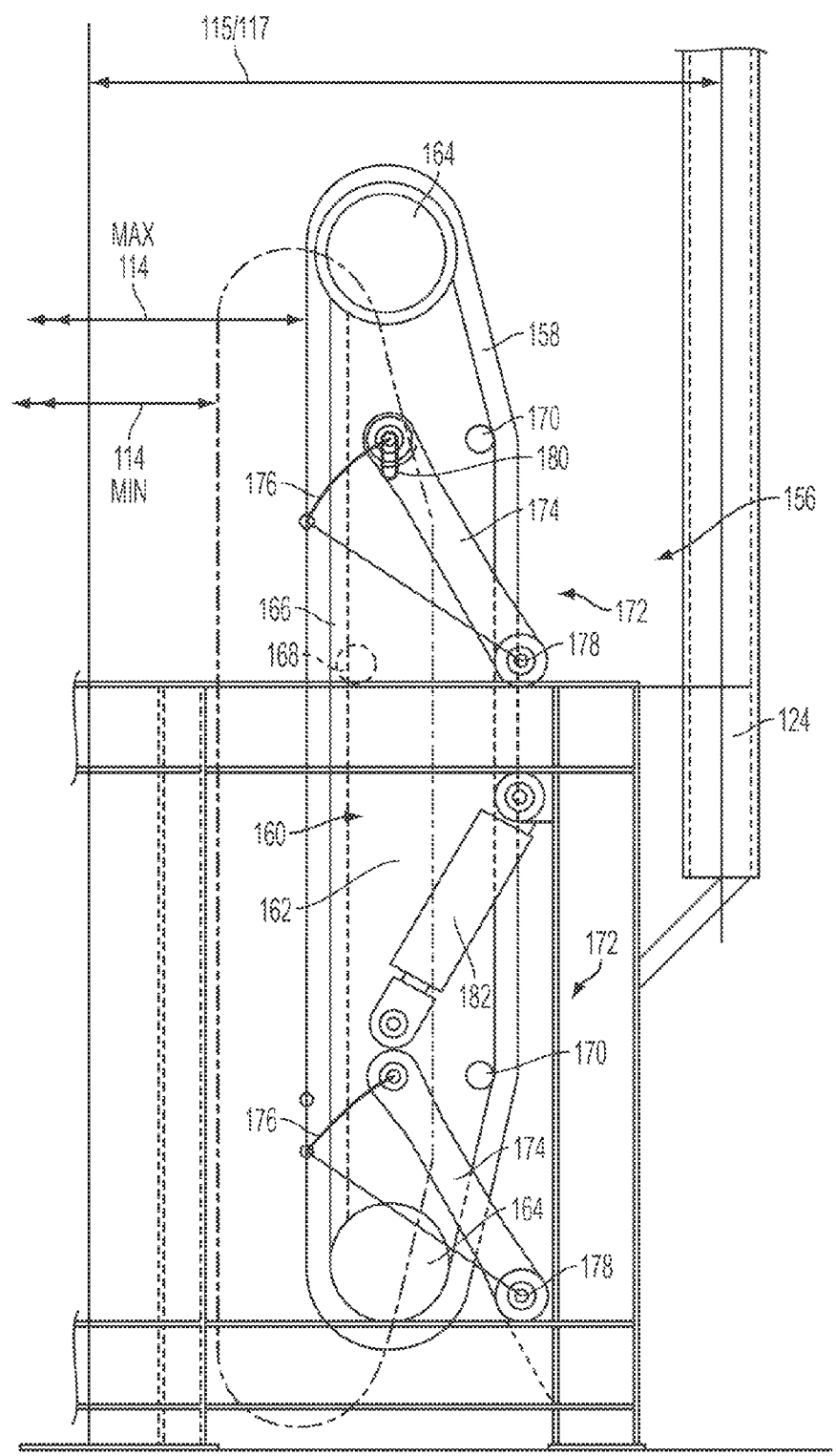
FIG. 6 is a side view of a crawling device of the erection apparatus of FIG. 1.

Referring now to FIG. 6, the crawling devices 156 may include a wheel driven track 158. The track 158 may extend circumferentially through a track path defined by a track assembly 160 of the crawling device 156. The track assembly 160 may include a core member 162 extending along the length of the crawling device 156 with one or more track wheels 164 adapted to engage the inside face of the track 158 and positioned on opposing ends of the core member 162. The track 158 may pass along the surface of a first track wheel 164, to the second track wheel 164, across the surface of the second track wheel 164 and back to the first track wheel 164. The track assembly 160 may also include a slide rail 166 positioned between the track wheels 164 to maintain continuous support along the inside face of the track 158 between the track wheels 164. Alternatively or additionally, the track assembly 160 may include a plurality of intermediate wheels 168 to maintain continuous support along the inside face of the track 158. One or more of the track wheels 164 may be power driven to cause the track 158 to move along the track path. The track assembly 160 may also include one or more inboard guides 170 in the form of wheels or slide rails to guide the track 158 within the crawling device 156, from one track wheel 164 to the other track wheel 164. The track assembly may also include a tensioning device for maintaining tension on the track 158 to maintain its position on the track wheels 164. This tensioning device may include a spring type tensioning device including a wheel that is biased generally perpendicular to the track surface at some point along its path, the device being unopposed so as to cause the track 158 to deflect and thus take up any slack in the track 158.

The crawling device 156 may be moveably positioned within the body portion via a linkage system 172. Alternatively, or additionally, the track assembly 160 may be moveably positioned relative to the crawling device 156 via a linkage system 172. In a preferred embodiment, the linkage system may be a four-bar linkage 172 as shown. The crawling device 156 may be supported relative to the body portion via a first and a second pair of linkage arms 174. Both the first and second pair of linkage arms 174 may be pivotally connected to the body portion (e.g., frame 116) and may extend from the body portion and be pivotally connected to the crawling device 156. Each arm of a given pair 174 may be the same length as the corresponding arm of its pair and may be pivotally connected to the body portion and the crawling device 156 at the same location as its corresponding arm. As such, each arm of a pair of arms 174 may articulate together with its corresponding arm. Additionally, the length of the arms of the first pair 174 may be the same length as the aims of the second pair 174. Accordingly, as shown in FIG. 6, as the crawling device 156 moves away from the body portion, the pivotal attachments of each of the pairs 174 follow a radial arc 176 defined by a radius, substantially equal to the length of the pair of linkage arms 174, and a center point 178 located substantially at the pivotal connection of the linkage arms 174 to the body portion. Accordingly, as the crawling device 156 is moved away from or toward the body portion, it follows a similar radial arc 176 at all points along its length.

In some embodiments, for example, where the mast diameter 114 changes (e.g., decreases with height), the pivotal connection of the linkage arms 174 to the crawling device 156 may include a slotted hole 180 as shown in FIG. 6. In these embodiments, the slotted hole 180 may allow one end of the crawling device 156 to extend further from the body portion than the opposing end creating a sloped relationship between the crawling device 156 and the longitudinal direction of the body portion. A bolt may be used to fix a position in the slotted hole 180. In other embodiments, the angle of the crawling device may not be adjustable and may be configured to match the slope of the tapering mast.

The crawling device 156 may be extended away from body portion or be drawn toward the body portion via an actuation device 182. In a preferred embodiment, the actuation device 182 may be in the form of a hydraulic ram pivotally connected to the body portion and pivotally connected to the crawling device 156. As shown, the ram may be in a retracted position and may be actuatable to a series of extended positions, thereby allowing for controlled extension or withdrawal of the crawling device 156 relative to the body portion. A series of crawling devices 156 positioned within a frame 116, may thus, for example, encroach and engage the mast by extending them away from the interior of the frame 116 and toward one another. The crawling devices 156 may then be further extended to create a compressive force between the track 158 and the mast to develop a sufficient frictional force for holding the frame 116 on the mast. It is noted that where the mast is tapered, less friction may be required.

The track 158 may be a belt type track or it may be more akin to a chain type track. In either case, the track 158 may include a plurality of engaging saddle features 184 adapted to engage the mast as shown in FIG. 5. That is, the saddle features 184 may have a concave surface with a contour substantially similar to the contour of the outside surface of the mast as shown in FIG. 5. The engaging saddle features 184 may be positioned uniformly along the length of the track 158 and may be separated from one another to facilitate easier bending of the track 158 as it passes over the track wheels 164. It is noted that the mast is shown in FIG. 5 to vary from a 5 m diameter to a 3 m diameter for purposes of description only. That is, two of the crawling devices 156 are shown to engage the mast at a point where it has a 5 m diameter and the other two are shown to engaging the mast at a point where it has a 3 m diameter. In use, all of the crawling devices 156 would engage the mast at a given point defining a particular mast diameter. In some embodiments, the saddle features 184 may be adapted for one of these diameters, an average of the two, or some other similar diameter. That is, the concave surface may have a curvature matching one of the listed diameters or some other similar curvature. Alternatively, the saddle features 184 may be adapted to accommodate other surfaces such as flat or non-uniformly curved surfaces. The track and/or the saddle features 184 may be made from suitable high-friction and/or resilient materials including, but not limited to plastic, rubber or NYLATRON®. Other gripping materials may be used. In the case of chain like tracks, the chain may be made from metals, composites or other more rigid materials.

The described movement mechanism may be the same as or similar to, or may include several portions of a pipe tensioner as used in offshore pipeline laying. For example, pipe tensioners as manufactured by HUISMAN™ Inc., SAS™, NORSON™, REMACUT™, or WESTECH™ may be used or adapted.

Figure 7:
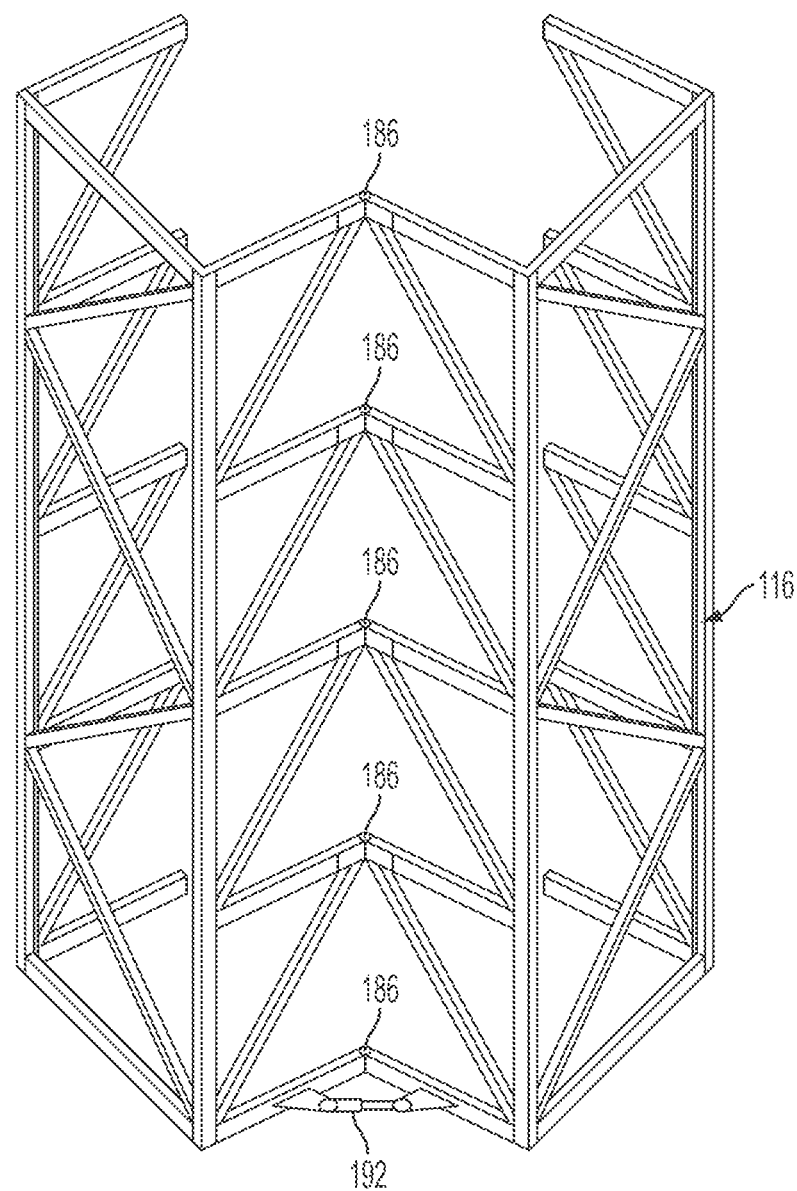
FIG. 7 is a perspective view of the erection apparatus frame in an open position.

Break System for Removal. Referring again to FIG. 5, a top view of an erection apparatus 122 is shown. As shown, the erection apparatus 122 may include a break system for use in removing the erection apparatus 122 from an assembled mast. The break system may include a series of pivot pins 186 extending through the laterally extending members of the frame 116 along the longitudinal length of the rear face 188 of the frame 116. The rear face 188 of the frame 116 may include an opener mechanism 192 extending along the rear face 188 of the frame. The opener mechanism 192 may be aligned with a selected laterally extending member and may be secured to the selected member at two locations that are positioned on opposing sides of the pivot pin 186. The front face 194 of the frame 116 may include release pins 196 positioned in the laterally extending members of the frame 116 along the longitudinal length of the frame 116. The release pins 196 may be removable to release the sides 198 of the frame 116. As shown in FIG. 7, the opener mechanism 192, acting on the laterally extending member, may open the frame 116 by pivoting each half of the sides 198 of the frame about the pivot pins 186, thereby allowing for removal of the erection apparatus from around the mast. In an alternative embodiment, one of the faces of the frame may have hinges extending along the longitudinal length of one of its edges and a latch on the opposing edge. In this embodiment, the latch may be released allowing the respective face of the frame to pivot open like a gate allowing the frame 116 to be removed. This type of break system may be seen, for example, in FIG. 24.

Figure 8:
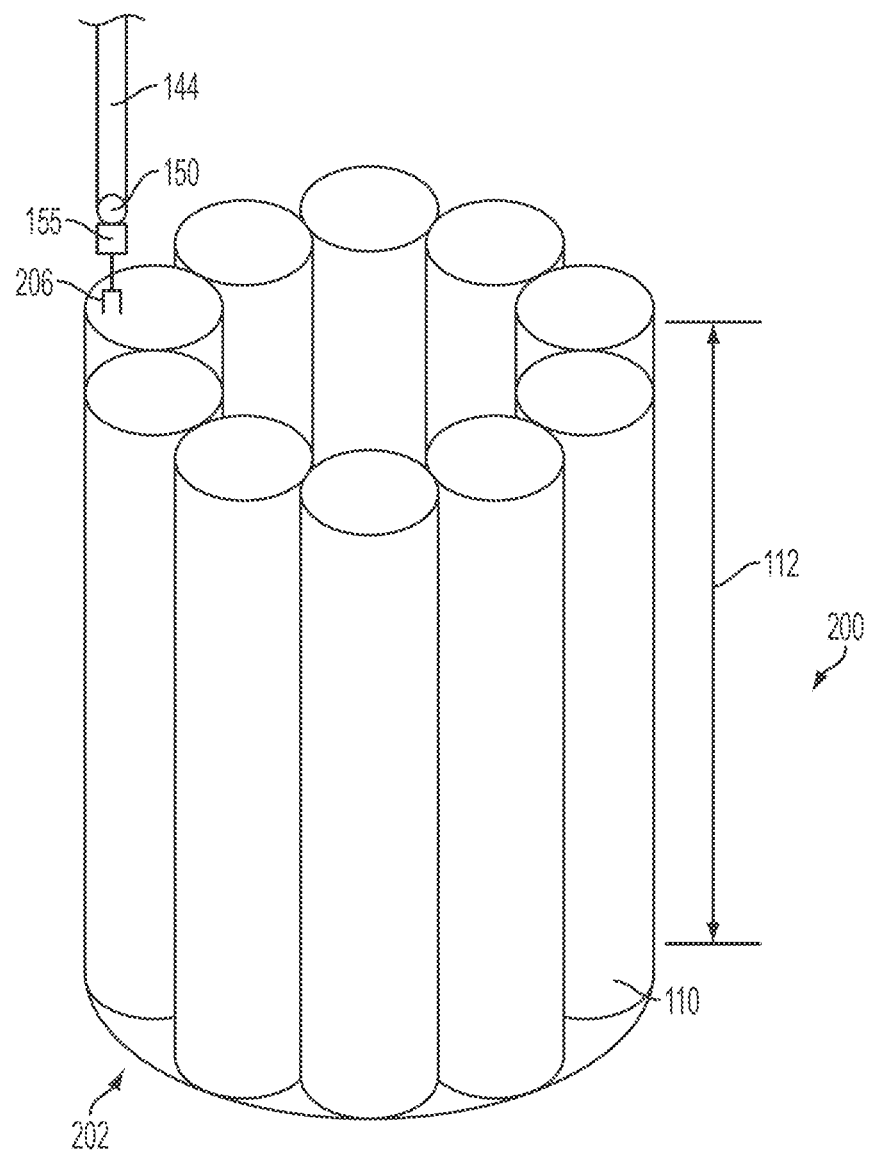
FIG. 8 is a perspective view of a section delivery device.

Section Delivery Device. As shown in FIG. 8, a delivery device 200 may also be included for handling the mast sections 110 for retrieval by the section handler. The delivery device may be positioned at or near the base 108. It may be positioned on a platform, suspended from the pedestal bolt flange 210, or it may be positioned on a barge anchored near or secured to the base. Other positions may be provided that are suitable for access of the materials by the section handler.

The delivery device 200 may be in the form of a magazine and may contain a plurality of mast sections 110. The magazine may be charged with a biasing mechanism that advances the mast sections 110 to a picking location 202 each time a mast section 110 is removed. Additionally or alternatively, the delivery device may include a conveyor system that positions the mast sections 110 in a picking location 202 each time a mast section 110 is removed by the section handler. In another embodiment, the delivery device may include a turntable type device that rotates a new mast section 110 into place each time a mast section 110 is removed. The delivery device may be automatic in that it is mechanically restrained from advancing the mast sections 110 until another mast section 110 is removed. Alternatively, the automatic nature of the delivery device may include a controller, a sensor, and a motor where the motor is activated by a controller when the sensor senses that a mast section 110 has been removed. Alternatively, the controller may be omitted and the actuation of the motor may be based on a circuit interruption type sensor where the removal of a mast section 110 from the delivery device causes an electrical contact to occur that activates the motor and advances a new mast section 110 to the picking location.

The delivery device may include one of several orientations. The delivery device may be an in-line delivery device. Alternatively, a radial delivery device as shown, positioned adjacent to or around the base of the mast, may be provided. Other orientations and delivery paths may be provided.

Controller. A controller 204 may also be provided as shown in FIG. 3 for controlling the several functions of the erection apparatus 122 and/or the erection apparatus 222 described below. The controller 204 may be a computer based device or other known controller device. The controller 204 may be in communication with the winch 142 and adapted to actuate the winch 142 to a payout or haul in condition. The controller 204 may also be in communication with the trolley 140 and may be adapted to control the motion of the trolley 140 along the length of the boom 138. Additionally, the controller 204 may be adapted to control the picking device 206 for engaging the mast sections 110 and lifting them from a picking position. The controller 204 may also be adapted to control the delivery device 200 where provided. The controller 204 may also be adapted to control the movement mechanism. In the case of apparatus 122, for example, this may be by way of being in communication with the crawling devices 156, controlling the extension of the track assemblies 160 and controlling the advancement or reversal of the track motion.

The controller may also be adapted to monitor the crawling devices 156. That is, pressure sensors may be included to monitor the pressure placed on the mast by the opposing devices 156. The controller may monitor and control this pressure to avoid overstressing the mast or crushing the mast.

Power may be provided in the form of a standalone generator 208 as shown in FIG. 3. For example, a diesel hydraulic power unit may be provided and may be in hydraulic communication with each of the powered devices on the erection apparatus 122 including, but not limited to the winch 142 and the crawling devices 156 of the trolley 140. The delivery device 200, where provided, may include its own power source or it may also be powered by the standalone generator.

Figure 26:
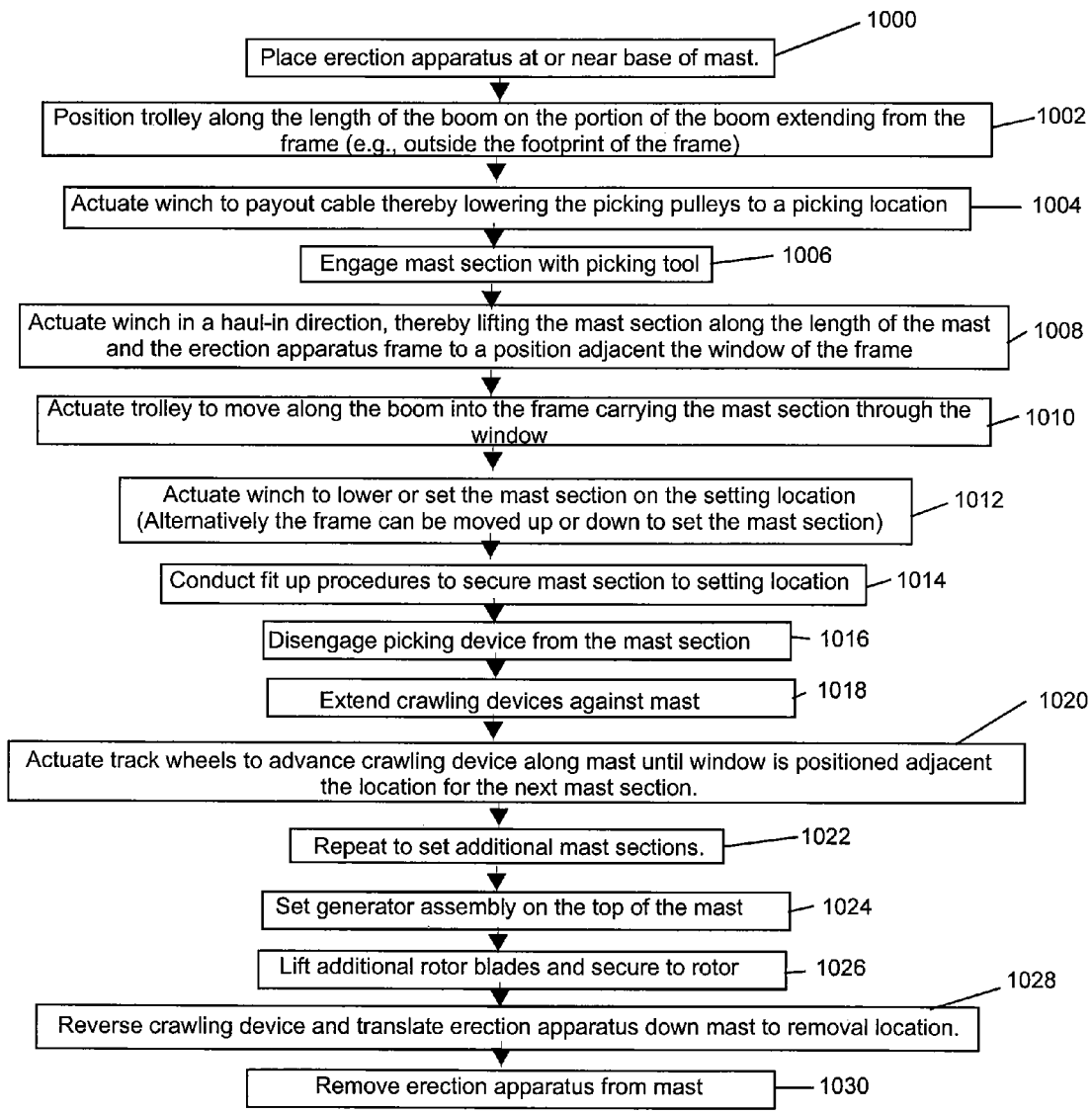
FIG. 26 includes a flowchart of a method of erecting a wind turbine system.
Figure 27:
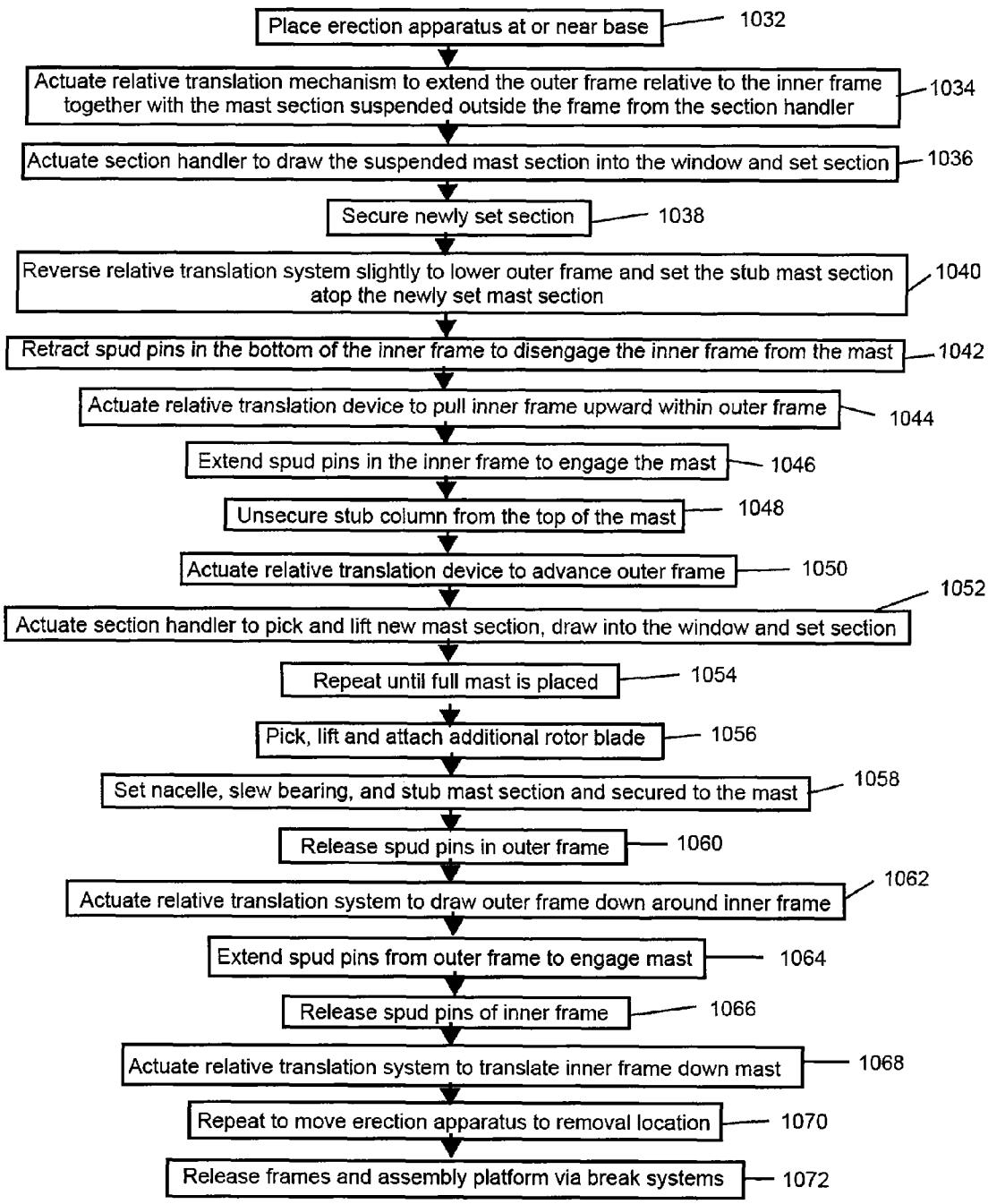
FIG. 27 includes a flowchart of an alternative method of erecting a wind turbine system.

Use and Operation. The use and operation of the crawling type erection apparatus 122 may be described with reference to FIG. 26. In use, the erection apparatus 122 may be placed at or near the base 108 of the mast. (Block 1000) In some embodiments, for example in off shore platform mounting cases, the initial mast sections 110 may be placed with a crane and a pedestal bolt flange 210 may be provided as shown in FIG. 1. In these cases, the erection apparatus 122 may be initially placed on the pedestal bolt flange 210. Additionally, the energy generator 100 may be placed on the frame 116 and secured. In some embodiments, at least a first mast section may be placed prior to placement of the erection apparatus.

Referring to FIG. 2, the trolley 140 may be positioned along the length of the boom 138 on the portion of the boom 138 extending from the frame 116. (Block 1002) The winch 142 may be actuated to payout winch cable 144 thereby lowering the picking pulleys 150 to a picking location 202 where the winch 142 may be stopped. (Block 1004) Once lowered, a picking device 206 (see FIG. 8) in the form of a clevis, hook, jaw, or other picking device 206 may engage a mast section 110. (Block 1006) The mast section 110 may be positioned at the picking location 202 by a mover or it may be positioned in a delivery device 200 as previously described. Once the mast section 110 is engaged, the winch 142 may again be actuated, this time in a haul-in direction, thereby lifting the mast section 110 along the length of the mast and the erection apparatus frame 116 to a position adjacent the window 136 of the frame 116. (Block 1008) Once positioned adjacent to the window 136, the winch 142 may be stopped. Actuation of trolley 140 may then occur, causing the trolley 140 to move along the boom 138 into the frame 116 and carrying the mast section 110 through the window 136 of the frame 116. (Block 1010) The trolley 140 may be used to position the mast section 110 directly above the setting location on the mast axis. Once in position, the winch 142 may again be actuated to lower or set the mast section 110 on the setting location. (Block 1012) Alternatively or additionally, the frame may be moved up or down to set the mast section 110. Fit up procedures may be conducted and the mast section 110 may be secured to the setting location via bolting, welding, or other known securing methods. (Block 1014) Once the mast section 110 is properly fit up and/or secured, the picking device 206 may be disengaged from the mast section. (Block 1016)

Once one mast section 110 is properly fit up and/or secured, the erection apparatus 122 may advance along the length of the newly constructed mast portion. The controller 204 may extend the track assembly 160 of any and/or all of the crawling devices 156 of the movement mechanism by actuating the ram or other actuation device 182 of the crawling devices 156. As such, the track assembly 160 may extend inward relative to the frame 116 causing the track 158 of the crawling devices 156 to engage the mast. (Block 1018) The position of the crawling devices 156 relative to the mast may be maintained by the frame 116 and the tension strap member 157 extending around the perimeter of the frame 116. As such, the engagement of the track 158 with the surface of the mast may create a normal force between the track 158 and the mast surface allowing for the development of a frictional force between the track 158 and the surface of the mast. The track wheel 164 or wheels of the crawling devices 156 may be actuated so as to advance the track 158 along the track path within the crawling devices 156. (Block 1020) The frictional force between the track 158 and mast may thereby allow the crawling devices 156 to advance along the mast and carry the frame 116 along with them. The crawling devices 156 may continue along the mast until the window 136 of the frame 116 is positioned adjacent the location for the next mast section 110.

Once in position, the process may be repeated to set an additional mast section 110. Additional mast sections 110 may continue to be placed until all of the mast sections 110 have been placed. (Block 1022) Once the last mast section 110 has been placed, the energy generator 100 may be set on the top of the mast. (Block 1024) This may occur by actuating the crawling devices 156 in reverse to lower the top of the frame 116 and thus the slew bearing 134 of the nacelle 106 downward to position the slew bearing 134 on the top of the mast. Fit up and securing measures may then be taken to secure the nacelle 106 to the top of the mast.

At some point in the process, an additional rotor blade may need to be lifted and secured to the rotor 104. (Block 1026) In cases where the initial mast height is insufficient to have all blades installed on the generator 100 and still have ground clearance, one of the blades may be left off of the generator 100. When the generator 100 is lifted by the frame 116 to a height sufficient for the additional blade to clear the ground, the additional blade may be lifted by the winch/boom/trolley assembly and be secured to the rotor 104. This may occur at some point after sufficient clearance has been established and may occur before or after the generator 100 is secured to the top of the mast.

Once the nacelle 106 is fit up and/or secured, the frame 116 may be freed from the nacelle 106. The crawling device 156 may be reversed, allowing the frame 116 to crawl fully down the length of the mast to the position of the pedestal bolt flange 210 or the base 108. (Block 1028) In other embodiments, the pedestal bolt flange 210 may be removed and the frame 116 may crawl further down the mast.

The frame 116 may then be removed from the mast. (Block 1030) This may occur by removing the release pins 196 from the front face 194 of the frame 116 and by further actuating the opener mechanism 192 on the rear face 188 of the frame 116. The opener mechanism 192 may draw the two halves of a laterally extending member toward one another, causing each half of the rear face 188 and the corresponding sides 198 of the frame 116 to pivot about the pivot pins 186 positioned along the height of the rear face 188 of the frame 116. This pivoting motion may allow the front 194 of the frame 116 to open as shown in FIG. 7 further allowing removal of the frame 116 from the mast by translating the frame 116 perpendicular to the mast. This may occur through the use of a crane, a pulling device, or other equipment.

Telescoping Frame System

Referring now to FIGS. 9-25, another embodiment of an erection apparatus is shown. Similar to apparatus 122, the erection apparatus 222 may include a body portion, a movement mechanism, and a section handler. In the present embodiment, the body portion may be in the form of a set of frames 216A, 216B, the movement mechanism may be in the form of a relative motion system 218, and the section handler may be a section inserter 220. The erection apparatus 222 may be adapted to surround the mast and climb the mast as it constructs additional sections of the mast.

Figure 9:
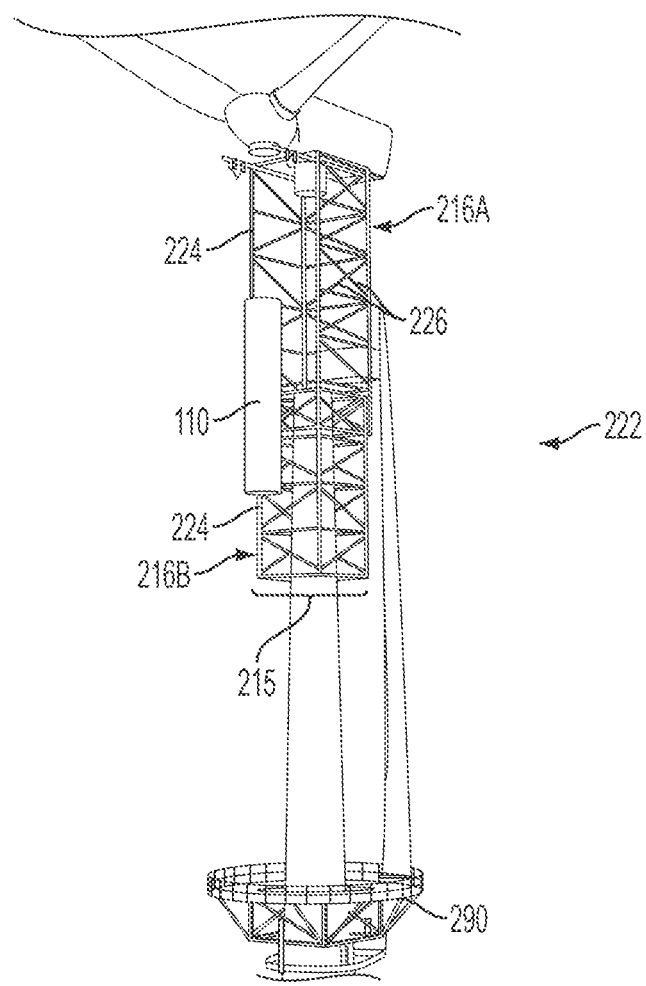
FIG. 9 includes a perspective view of another embodiment of an erection apparatus on a mast.

Body Portion. Referring now to FIG. 9, the body portion may be in the form of an inner frame 216B and an outer frame 216A. The set of frames 216A, 216B may be adapted to surround and move along the mast via telescoping motion relative to one another. That is, frame 216B, for example, may be sized to telescope within frame 216A. Alternatively or additionally, the body portion may be in the form of a set of shells or other structures. As shown, each of the frames 216A, 216B may include a plurality of longitudinal members 224 extending generally parallel to the direction of the extending mast. The longitudinal members 224 may be connected, as shown, by a plurality of lattice members 226. The longitudinal members 224 may be positioned around and offset from the perimeter of the mast, and lattice members 226 may extend between adjacent longitudinal members 224 forming the surrounding frames 216A, 216B. The frames 216A, 216B may be rectangular or alternative surrounding shapes may be used such as for example, round, triangular, hexagonal, pentagonal, etc. In the case of a rectangular frame, the diagonal dimension 215 of frame 216B may be approximately 5-10 m, preferably 7.4 m. For the straight or side dimension 217, it may be 3-8 m, preferably 5.25 m. Other frame sizes may be used including sizes outside the range mentioned. The frame 216A may be sized to allow frame 216B to telescope within it and as such, may have cross-sectional dimensions slightly larger than frame 216B.

Of the two frames 216A and 216B, frame 216A may be most similar to frame 116. Frame 216A may have a generator end and a mast end. The generator end of the frame 216A may include one or more cross members 228 for supporting the section handler. As shown, the cross members 228 may extend perpendicular to the longitudinal members 224 and may extend from one longitudinal member 224 to an adjacent longitudinal member 224. Additionally or alternatively, the cross members 228 may extend to other longitudinal members 224 and may extend across the frame space 230 to an opposing longitudinal member 224.

Like frame 116, frame 216A may include a generator support 232 positioned on the generator end of the frame 216A. The generator support 232 may be the same or similar to that described with respect to frame 116. Also like frame 116, frame 216A may include a window 236 on a front side adapted to receive a section 110 of the mast. The window 236 may be sized to receive a mast section 110 and as such, may have a height 237 at least slightly larger than the section length 112 and a width at least slightly larger than the section diameter 114. Preferably the height ranges from approximately 10-20 m, preferably 15.5 m. Other heights may be used including heights outside the range mentioned.

As mentioned, frame 216B may be sized to telescope within frame 216A and allow for some amount of clearance. The frame 216B may have a cross-sectional shape the same or similar to frame 216A so as to simplify the telescoping of frame 216B within 216A. However, other cross-sections may be used. For example, a circular frame may be used to telescope within a square frame. Other combinations of cross-sectional shapes may be used. Frame 216B may not include a window 236 and may instead include lattice structure on all sides of the frame 116.

Break System for Removal. The frames 216A and 216B may include a break system the same as or similar to the break systems described for frame 116. The break system may allow for the removal of the frames 216A, 216B from the mast upon completion of the erection process as shown best in FIGS. 24 and 25 described below.

Section Handler. As with the section handler described for erection apparatus 122, the section handler of the present apparatus 222, may include a series of booms and associated trolleys, pulley systems, and winches. Accordingly, the section handler may be used to pick mast sections from a position near the base of the mast and lift them into position for insertion through window 236 to extend the height of the mast. The section handler of the present apparatus 222 may include any and/or all of the features the same as or similar to the section handler described for the previously described erection apparatus 122.

Figure 10:
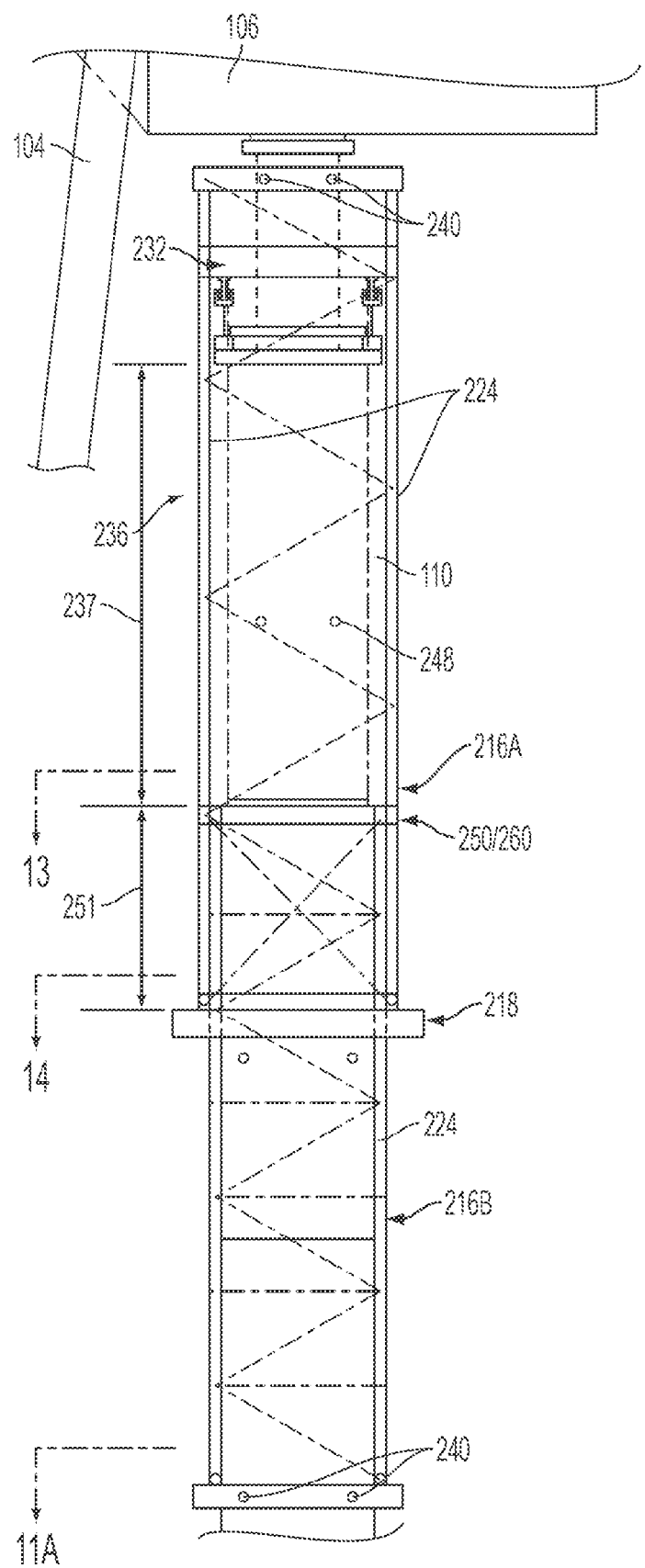
FIG. 10 shows a side view of a body portion of the apparatus of FIG. 9.

Movement Mechanism. Referring now to FIGS. 10-15, the movement mechanism may be in the form of a relative motion system 218. With particular reference to FIG. 10, the relative motion system 218 may include one or more mast engaging devices associated with each of the frames 216A, 216B. The mast engaging devices may be adapted to engage the mast to support a respective frame relative to the mast, allowing the other frame to telescope relative to it via a relative translation device. The relative motion system 218 may also include guides to limit the lateral motion of the frames 216A and 216B relative to one another and relative to the mast allowing for a relatively smooth telescoping motion of one frame relative to the other, while maintaining alignment with the mast.

Figure 11A:
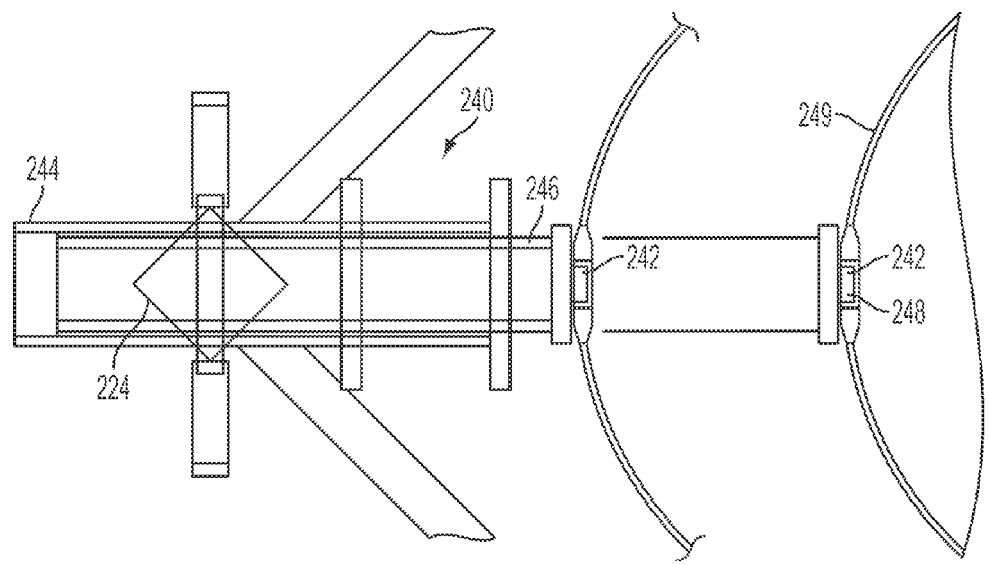
FIG. 11A shows a top view at section cut 11A on FIG. 10 of a mast engaging device of the embodiment shown in FIG. 9.
Figure 11B:
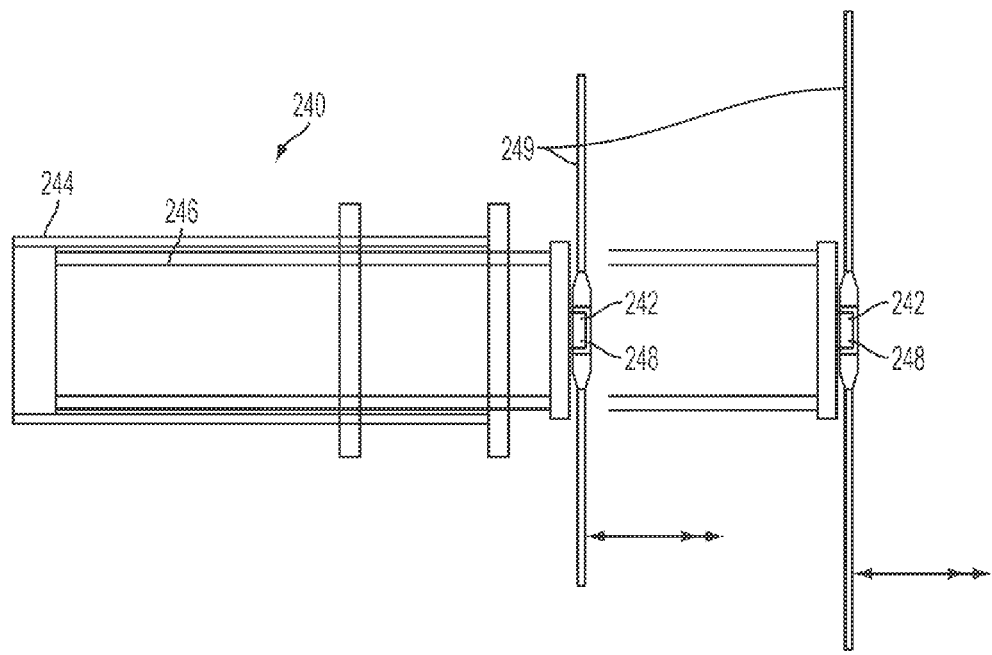
FIG. 11B is a side view thereof.

Referring to FIG. 10, a preferred mast engaging device, in the form of one or more spud pins 240, preferably at least three spud pins, is shown positioned near the bottom of inner frame 216B and near the top of outer frame 216A. Referring now to FIGS. 11A-11B, a spud pin 240 is shown in more detail. As shown, the spud pin 240 may be in the form of a base cylinder 244 and a telescoping cylinder 246 where the base cylinder 244 is secured to and extends from a respective frame 216A or 216B. It is noted that, in both FIGS. 11A and 11B, the position of the telescoping cylinder 246 is shown in two positions reflecting its ability to telescope in and out of the base cylinder 244 and further depicting its ability to engage the mast as the diameter of the mast changes. The connection of the spud pin 240 to the frames 216A, 216B may be a rigid connection capable of resisting shear and bending forces induced in a direction perpendicular to the distal end of the pin 240. In the present embodiment, the spud pin 240 is secured to and extends from a longitudinal member 224. The spud pin 240 may be sleeved through the longitudinal member 224 and welded thereto. As shown, the spud pins 240 near the bottom of inner frame 216B and near the top of outer frame 216A may be positioned to extend a suitable distance from the inner face of the frames 216A or 216B. This position relative to the frames 216A, 216B may be based both on the frame size and the corresponding mast diameters. In each case, the base cylinder position may be adjusted to minimize the eccentricity on the telescoping cylinder 246 while still providing for necessary mast clearances.

Figure 12:
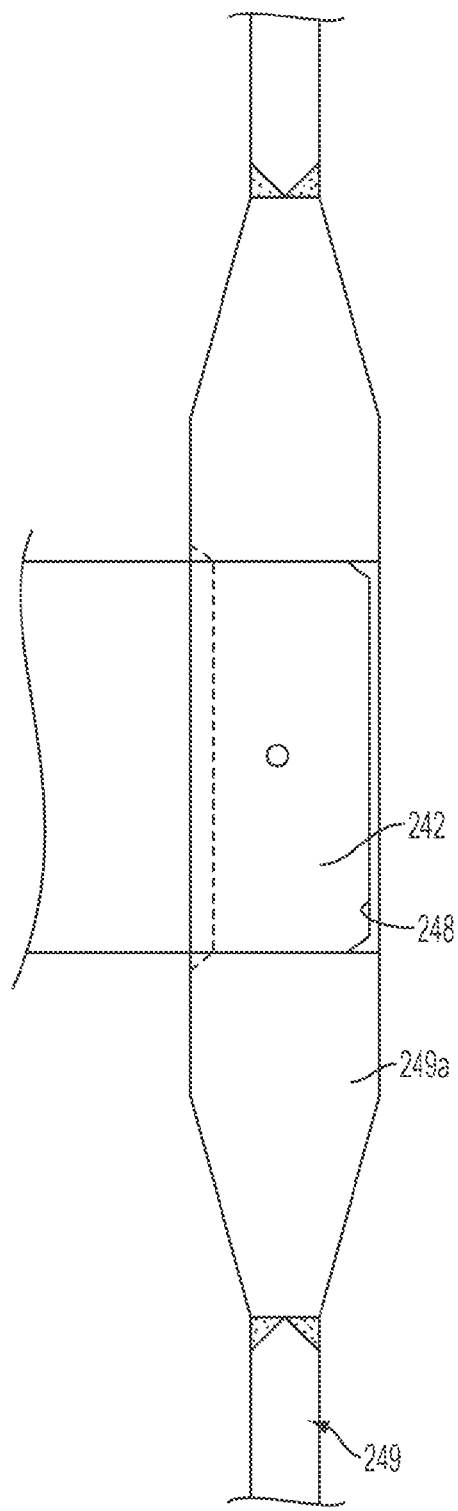
FIG. 12 shows a close up view of a reinforced portion of the mast for receiving the mast engaging device of FIGS. 11A-11B.

As shown in FIGS. 11A-11B, and as shown in a close-up view in FIG. 12, the spud pin 240 may include an engaging nub 242 at a distal end adapted to be inserted into a corresponding hole 248 in a wall 249 of the mast. The engaging nub 242 may extend from an end plate on the distal end of the telescoping cylinder 246 of the spud pin 240. The engaging nub 242 may be fixedly secured via welding or other known methods to the telescoping cylinder 246 and may thus be adapted to transfer shear and bending forces resulting from the engagement with the mast and the weight of the erection apparatus 222.

As also shown in FIG. 12, the hole 248 in the mast may be a reinforced hole. As shown, the hole 248 may be formed by replacing a portion of the mast wall with a reinforcing plate 249a with a thickness greater than the mast wall. The reinforcing plate 249a may have a circular shape with a beveled perimeter creating a smooth transition from the thinner mast wall 249 to the thicker reinforcing plate 249a. The reinforcing plate 249a may be welded into the mast wall 249 and positioned to correspond to other radially positioned holes and to the geometry of the erection apparatus 222. It is noted that reinforcing pads may be used in lieu of a reinforcing plate 249a to reinforce the holes 248 in the mast wall. That is, one or more annular plates with center hole sizes matching that of hole 248 may be placed at each hole location on the outer and/or inner surface of the tower wall 249 in alignment with the hole 248.

The spud pins 240 may be positioned radially around the perimeter of the mast on the inner surface of the frames 216A and 216B and may be adapted to reciprocate radially inward and outward. Accordingly, at particular stages of the erection process, the spud pins 240 may be actuated to engage the mast thereby fixing the longitudinal position of the respective frame relative to the mast and allowing for relative translation of the other frame. At other stages, the spud pins 240 may be actuated to disengage the mast, freeing the respective frame to move longitudinally relative to the mast.

Figure 13:
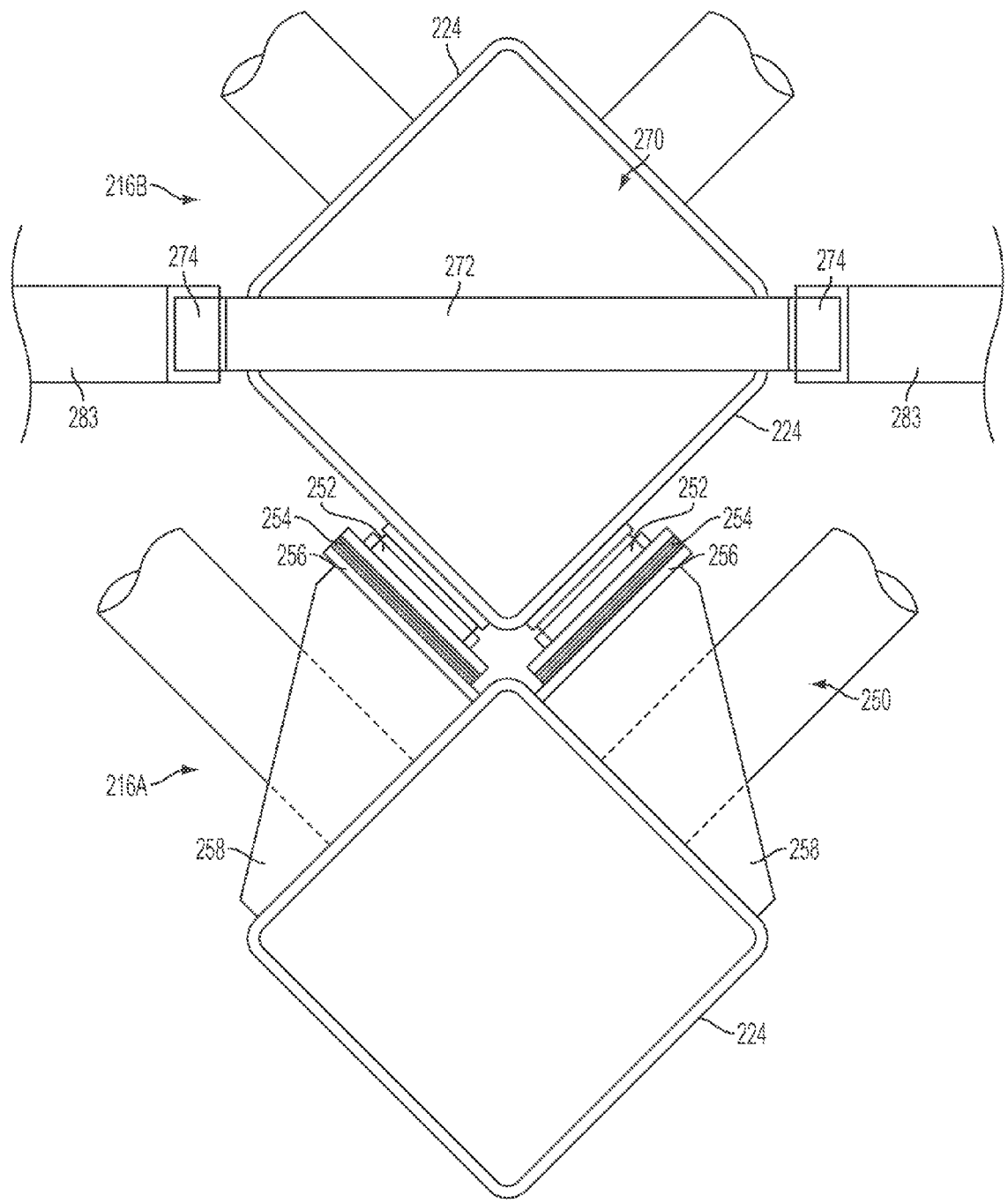
FIG. 13 shows a top view at section cut 13 on FIG. 10 of a guide within the body of the embodiment shown in FIG. 9.

Referring now to FIG. 13, a guide for telescoping motion is shown in the form of a lateral frame guide 250. As shown, the lateral frame guide 250 may be adapted to maintain the relative lateral positions of the inner frame 216B relative to the outer frame 216A. As shown, the lateral frame guide 250 may be secured to the outer frame 216A and may slidably engage the inner frame 216B along orthogonal faces of a longitudinal member 224 of the inner frame. The opposite configuration may also be used. In either case, the engagement of the guide along two orthogonal surfaces allows the frames to remain laterally aligned in both directions.

The lateral frame guide 250 may include two slide pads 252 configured to allow a longitudinal member of the inner frame 216B to slide relatively freely across its surface. The slide pads 252 may comprise nylon, fabric bearing material backed by metals such as bronze, steel, stainless steel, and the like. Other bearing materials may be used. The slide pads 252 may be supported by a bearing plate 256 and may be separated from the bearing plate 256 by a steel adjustment plate 254. The bearing plate 256 may be supported by one or more bracket plates 258 fixed to a longitudinal member 224 and fixed to the bearing plate 256. The bracket plate 258 may be welded, bolted, or otherwise secured to the longitudinal member and the bearing plate 256.

The lateral frame guide 250 may be positioned near the top of the jacking leg frame portion 251 of the outer frame 216A. As shown in FIG. 13, this position of the lateral frame guide 250 together with the engagement of a relative translation device near the bottom of the outer frame 216A may maintain the alignment of the frames relative to one another.

A lateral mast guide 260 (see FIG. 10) may also be included to control the relative lateral motion of the frames 216A, 216B relative to the mast. The lateral mast guide 260 may be the same or similar to the lateral frame guide 250. However, the lateral mast guide 260 may be positioned on the inside of the inner frame 216B so as to engage the outer surface of the mast. Accordingly, the bearing plates may be slightly radiused to accommodate the radiused shape of the outer surface of the mast. The lateral mast guide 260 may be positioned near the top of the inner frame 216B to stabilize the inner frame 216B and maintain it in alignment with the mast. Accordingly, in conjunction with lateral support provided a set of engaged spud pins 240, the frames 216A and 216B may remain in alignment with the mast. In addition or alternative to the sliding type of frame guide 250 and mast guide 260, rollers, bearings, or other relative adjacent motion devices may be provided.

Figure 14:
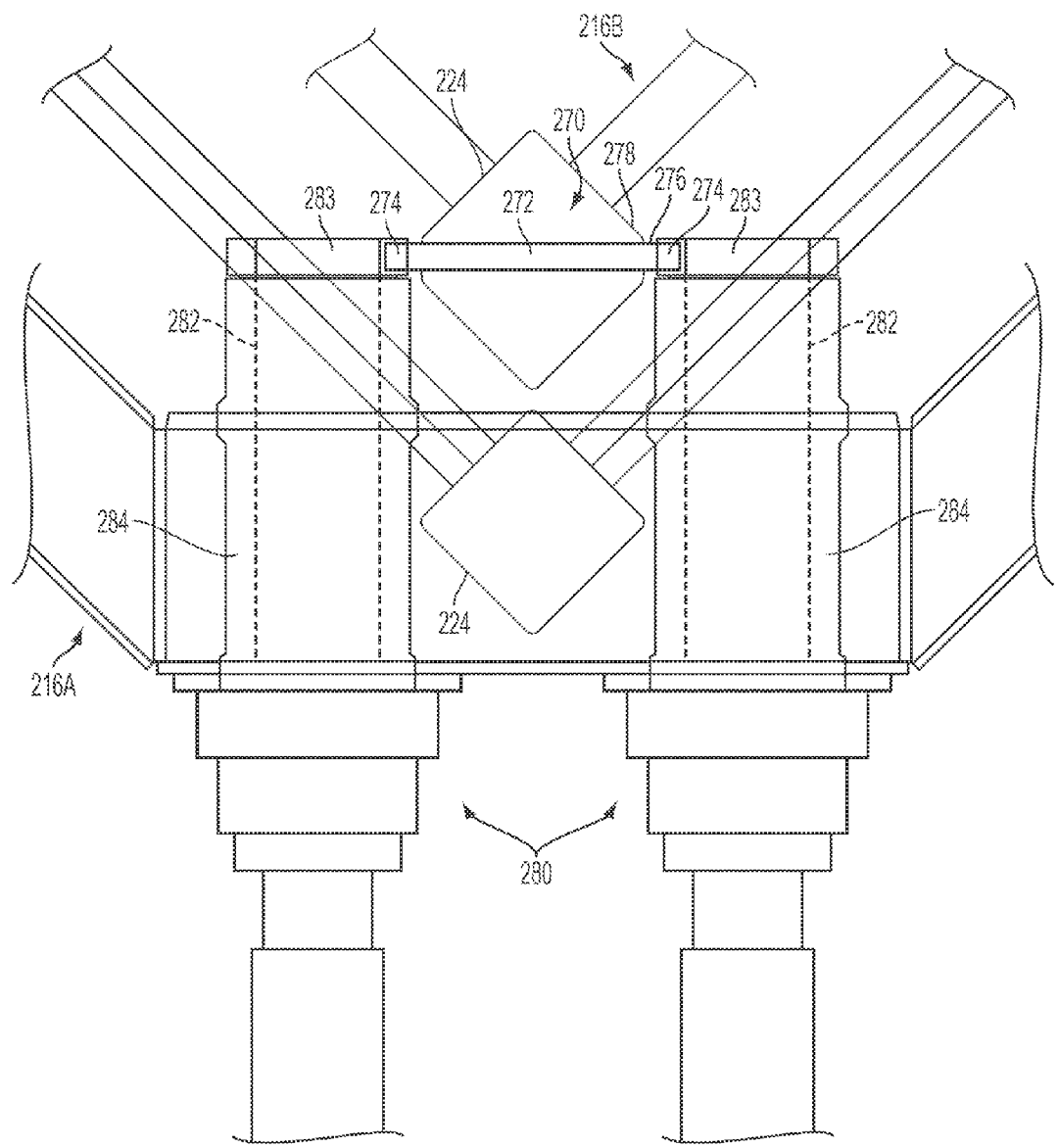
FIG. 14 shows a top view at section cut 14 on FIG. 10 of a relative translation device of the embodiment shown in FIG. 9.
Figure 15A:
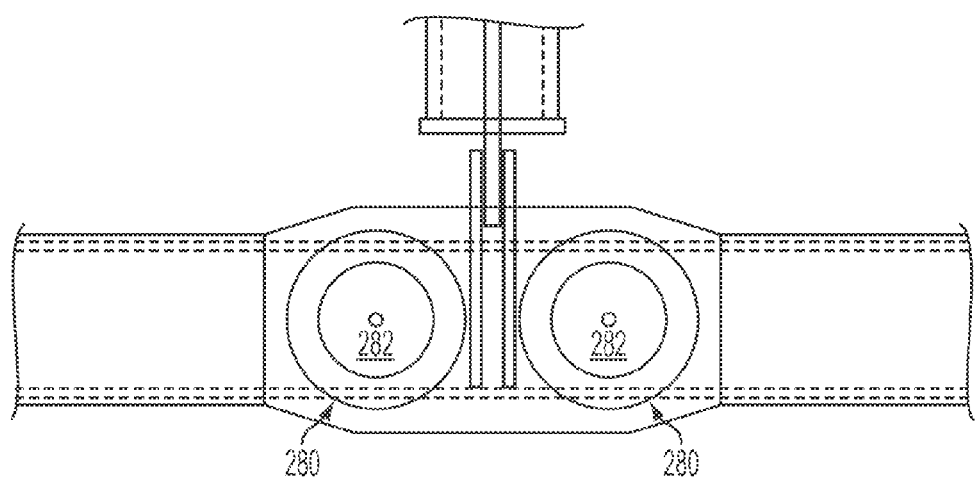
FIGS. 15A-15B show a top and side view of a relative translation device of the embodiment shown in FIG. 9.
Figure 15B:
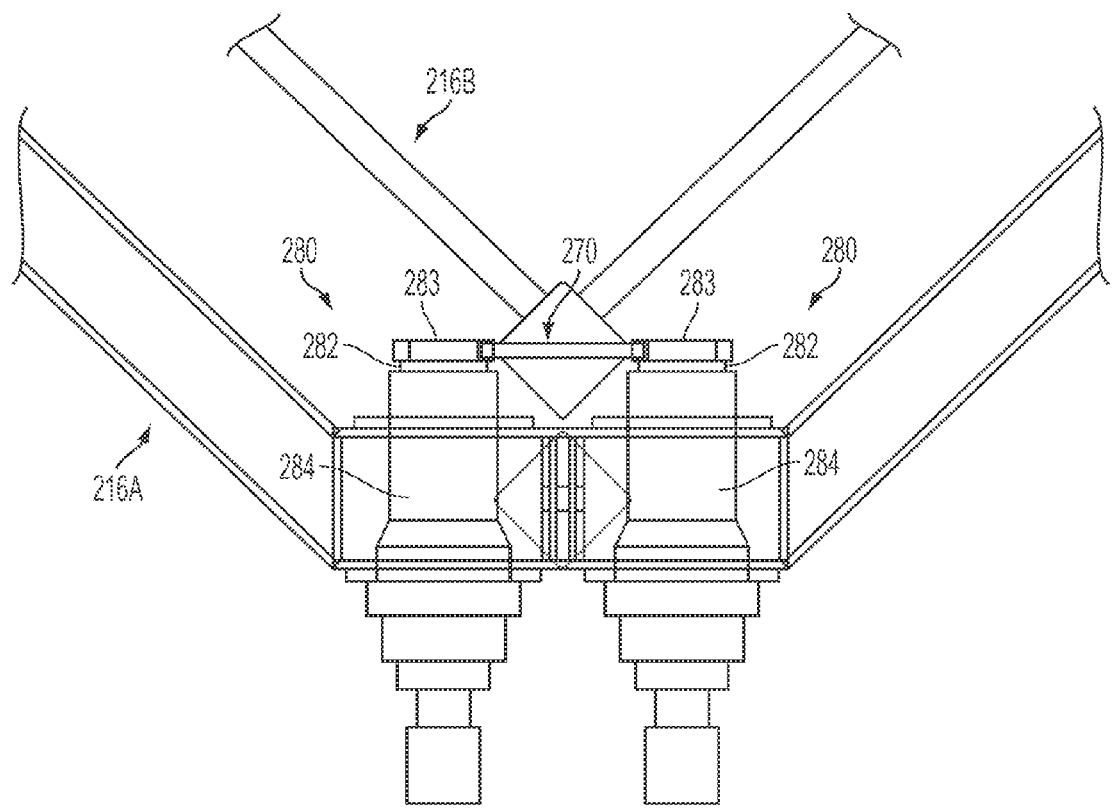

Referring now to FIGS. 14 and 15, a preferred relative translation device is shown in the form of a rack 270 and a pinion drive 280. As shown, the rack 270 may be incorporated into a longitudinal member 224 of the inner frame 216B and the pinion drive 280 may be mounted on the outer frame 216A. Accordingly, when the pinion drive 280 is actuated, the pinion drive 280 may translate along the rack 270 thereby moving the frame 216A relative to frame 216B.

Referring particularly to FIG. 14, the rack 270 may include a plate 272. The plate 272 may be positioned longitudinally along the centerline of a longitudinal member 224 such that a longitudinal edge 276 of the plate 272 protrudes slightly from the longitudinal side 278 of the longitudinal member 224. The rack 270 may further include gear teeth 274 extending along the length of the longitudinal edge 276 of the plate 272. In the present embodiment, the plate 272 extends out of both sides 278 of the longitudinal member 224 and gear teeth 274 are positioned on both longitudinal edges 276.

Still referring to FIG. 14, the pinion drive 280 may include one or more rotating shafts 282, preferably a pair of shafts 282 is provided as shown. The rotating shafts 282 may extend from a housing 284 mounted to the outer frame 216A. The distal end of the rotating shafts 282 may include gears 283 with a diameter and a tooth count corresponding to the gear teeth 274 on the rack 270. The pinion drive 280 may extend laterally inward from the outer frame 216A so as to engage the rack 270. Accordingly, as shown best in FIG. 15, the centerline of the pinion drive 280 may be offset from the centerline of the longitudinal member 224 a distance determined based on the rack 270 width and the pinion drive 280 diameter. This offset distance may allow the gear 283 from the pinion drive 280 to engage the gear teeth 274 on the rack 270. Accordingly, rotation of the pinion drive 280 may cause the pinion drive to translate along the rack 270 thereby translating the outer frame 216B relative to the inner frame 216A.

In an alternative embodiment (not shown), the relative translation device may be in the form of a system of telescoping cylinders. For example a hydraulic system with a housing cylinder and a telescoping cylinder may be used. In one embodiment of this system, the housing cylinder may be secured near the bottom of the inner frame with a bracket. The housing cylinder may be offset from and parallel to a longitudinal member of the inner frame, for example. The telescoping cylinder may be in concentric alignment with the housing cylinder and may have a distal end secured to a bracket of the outer frame. The telescoping cylinder may be offset from and parallel to a longitudinal member of the outer frame, for example, such that the hydraulic system is positioned in the space between the nested inner 216B and outer 216A frames. Actuation of the hydraulic system may cause the telescoping cylinder to extend from the housing cylinder thereby causing the relative translation of outer frame 216A relative to the inner frame 216B.

It is noted that several configurations may be provided. For example, the above described system may be reversed (e.g., the hydraulic system may be flipped upside down) and the housing cylinder may be attached to the outer frame near the top and the telescoping cylinder may be attached to the inner frame near the bottom. Additionally, the hydraulic system may be aligned with portions of the frame or sleeved within a portion of the frame rather than being offset from either or both frames. In one embodiment, the housing cylinder may form a longitudinal member of the frame. It is preferred, however, that the selected configuration of the hydraulic system be relatively compact and not cause the erection apparatus 222 to be overly long. Considerations may be given to the stroke of the system and the necessary size of the housing cylinder to accommodate that stroke when selecting a configuration of the hydraulic system.

Figure 16:
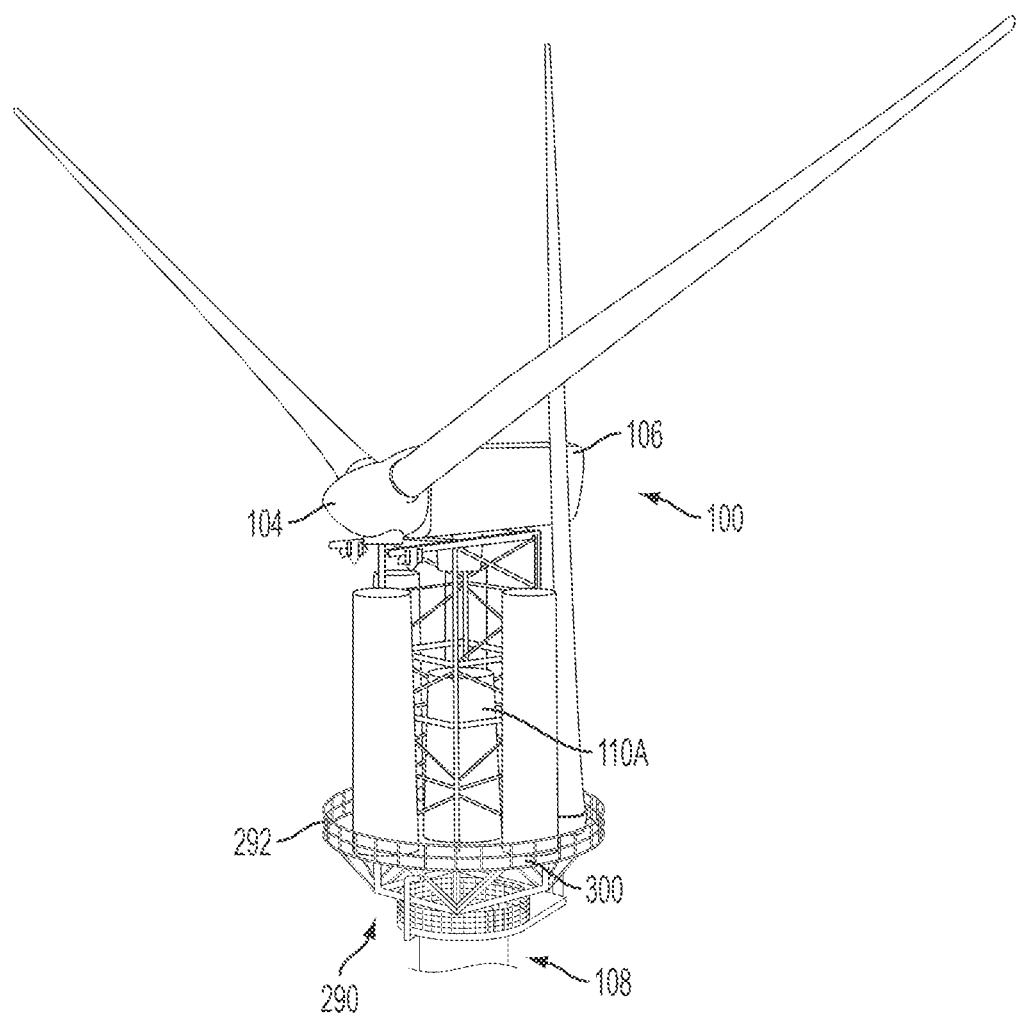
FIGS. 16-25 include several views of the embodiment of the erection apparatus of FIG. 9 at several stages of the erection process.

Assembly Platform. Referring now to FIG. 16, the erection apparatus 222, and/or 122, may also include an assembly platform 290. The assembly platform 290 may include a surface grating or other platform type material. The assembly platform 290 may be sized to surround the mast and provide a working surface and staging area for mast and/or rotor elements. The platform 290 may include framing and related elements for temporarily securing the platform 290 to the mast. In some embodiments, these related elements include a series of spud pins similar to those described with respect to the frames above. A railing 292 may also be provided around the perimeter of the platform 290. Similar to the break away feature of the frame 116, the assembly platform 290 may include a similarly hinged portion for separation of the assembly platform 290 from the mast after erection is complete.

Section Delivery Device. A section delivery device 300 may be provided similar to that described with respect to apparatus 122. Where an assembly platform 290 is provided, the section delivery device 200 or 300 may be adapted and sized to be positioned on the assembly platform 290. Accordingly, portions of the mast and/or rotor may be positioned thereon allowing them to be delivered to a pick location below the section handler. This may occur via a turntable type mechanism, allowing a particular portion to be moved into position.

Use and Operation. The use and operation of the telescoping type erection apparatus 222 may be described with reference to FIG. 26 in addition to FIGS. 9 and 16-25. The erection apparatus 222 may be placed at or near the base 108 of the mast. (Block 1032) In some embodiments, for example in offshore cases, the initial mast sections 110 may be placed with a crane up to the assembly platform 290 elevation and the assembly platform 290 may be placed. The erection apparatus 222 may then be positioned just above the assembly platform 290 as shown in FIG. 16.

As shown in FIG. 16, the erection apparatus 222 may be pre-attached to a starter mast section 110A via, for example, spud pins extending from frame 216B. The assembly platform 290 may also be attached to the starter mast section 110A. The assembly platform 290 may have mast sections previously positioned and secured thereto. In addition, the generator may be previously positioned on the top of the frame 216A and may include a portion of the rotor blades. That is, for purposes of ground and/or water clearance the remaining portion of the rotor blades may be positioned on the assembly platform for later installation on the generator. The generator may be supported via a stub mast section secured to the slew bearing of the generator. The stub mast section may include holes for receiving spud pins and the generator may be supported via engagement of the spud pins positioned near the top of the frame 216A.

The erection apparatus 222, the starter section 110A, the assembly platform 290, and all of the pre-positioned pieces may all be set on the base 108 by setting the starter section 110A with the other portions attached thereto. Once in position and secured, the erection apparatus 222 may begin the erection process.

Figure 17:
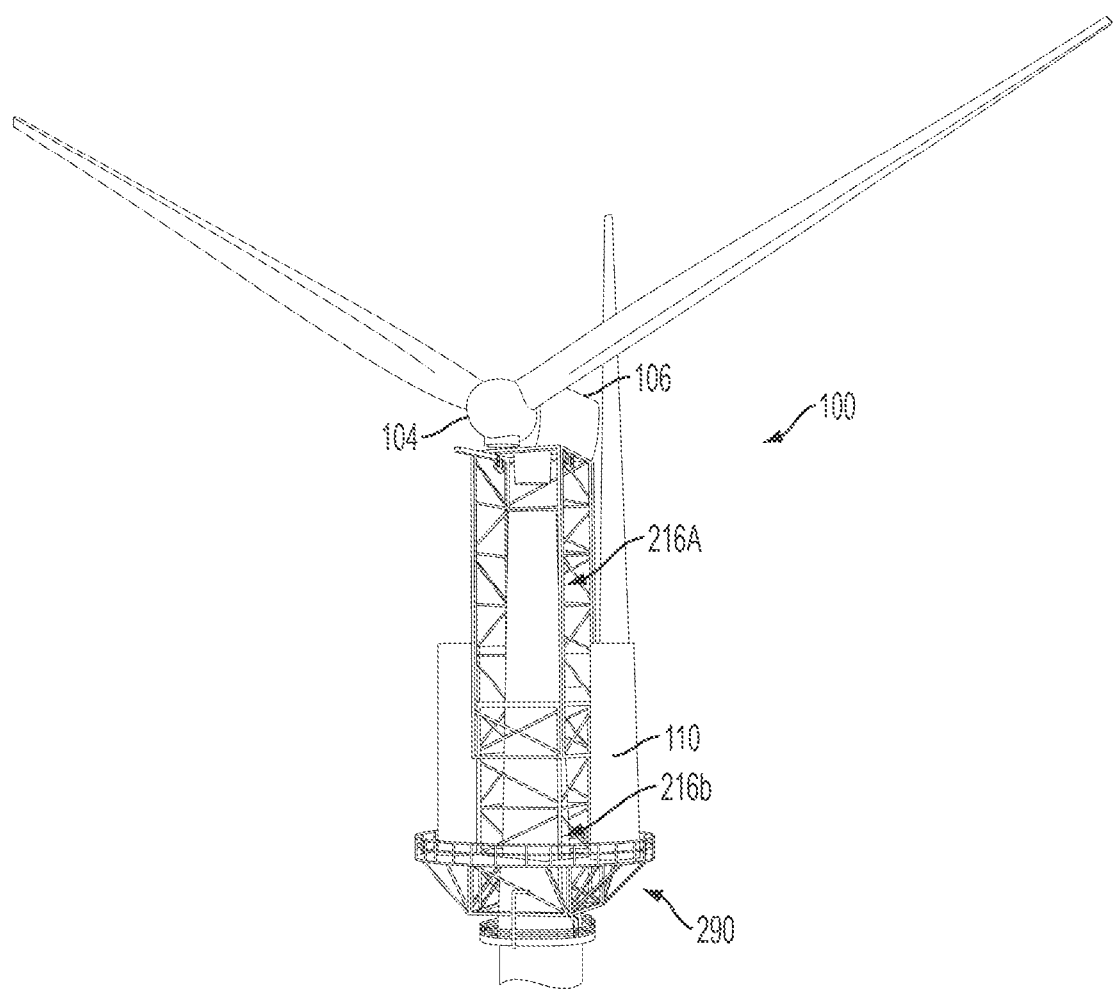

The section handler may have a mast section previously secured to the cables extending from the trolleys. The relative translation mechanism may be actuated to extend the frame 216A together with the mast section relative to frame 216B. (Block 1034) In the preferred embodiment, this may include actuating the pinion drive 280 to cause the translation of the rack 270, thereby translating the outer frame 216A upward relative to the inner frame 216B. Once the section insertion window of frame 216A is raised to a point above the previously set can section 110, the trolleys of the section handler may then be actuated to draw the suspended mast section into the window. (Block 1036) As with apparatus 122, the section handler may then set the mast section down on top of the lower section or the frame 216A may be reversed slightly to set the mast section down. (Block 1038) This stage is shown in FIG. 17. Once the newly set mast section is secured, the process may continue.

In preparation for pulling the frame 216B within frame 216A, the relative translation system may be reversed slightly to lower frame 216A and set the stub mast section atop the newly set mast section, thereby relieving the frame of the weight from the generator and providing support for the outer frame 216A. (Block 1040) That is, as previously mentioned, the outer frame 216A may be engaged with the stub mast section via spud pins 240. As such, when the stub mast section is set atop the newly set mast section, the weight of the generator may be transferred to the mast and the outer frame 216A may become suspended via the spud pins 240 from the stub mast section.

Figure 18:
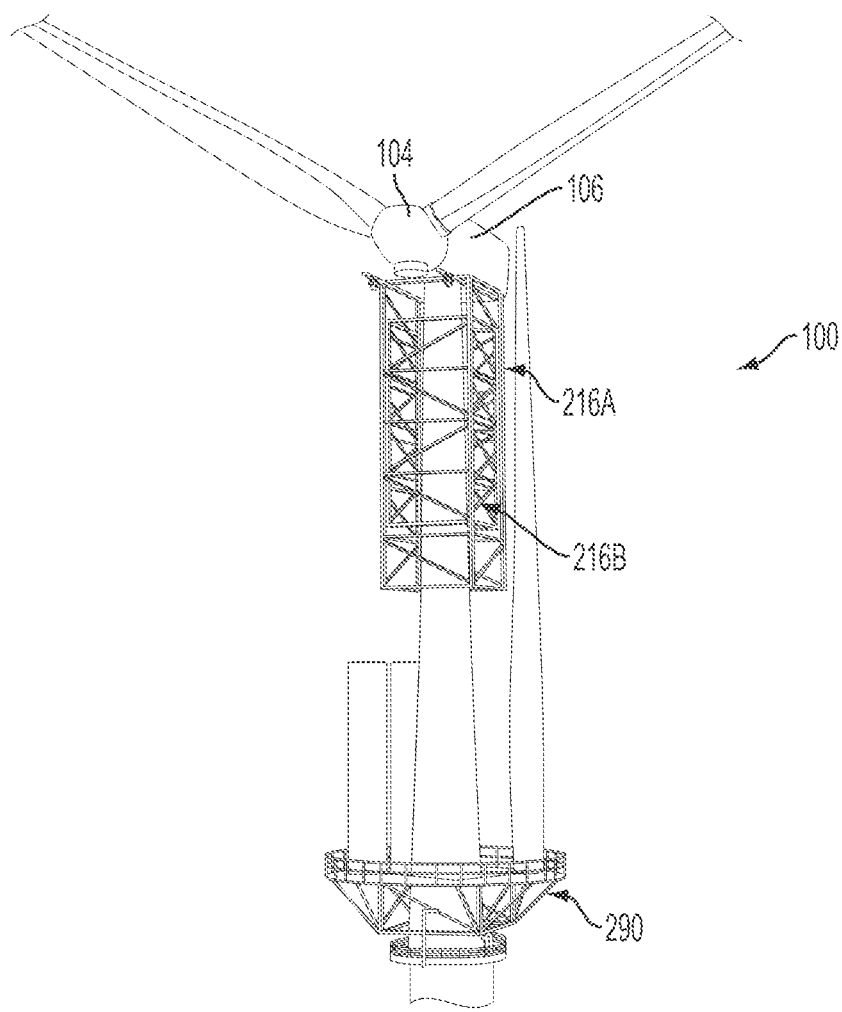

The spud pins 240 in the bottom of the frame 216B may then be retracted to disengage the frame 216B from the mast causing the entire frame assembly to be suspended from the spud pins 240 of frame 216A engaged in the stub mast section. (Block 1042) The relative translation devices may then be actuated to pull the frame 216B within frame 216A. (Block 1044) That is, in the preferred embodiment, the pinion drive 280 may be reversed to cause the rack 270 to translate in a direction opposite that seen when the frame 216A was initially lifted. The frame 216B may be pulled a sufficient distance to align the spud pins 240 in the bottom of frame 216B with holes 248 in the mast. This position is shown in FIG. 18. The spud pins 240 in the bottom of frame 216B may then be extended to engage the holes 248 in the mast and thus support the weight of the erection apparatus 222. (Block 1046)

Figure 19:
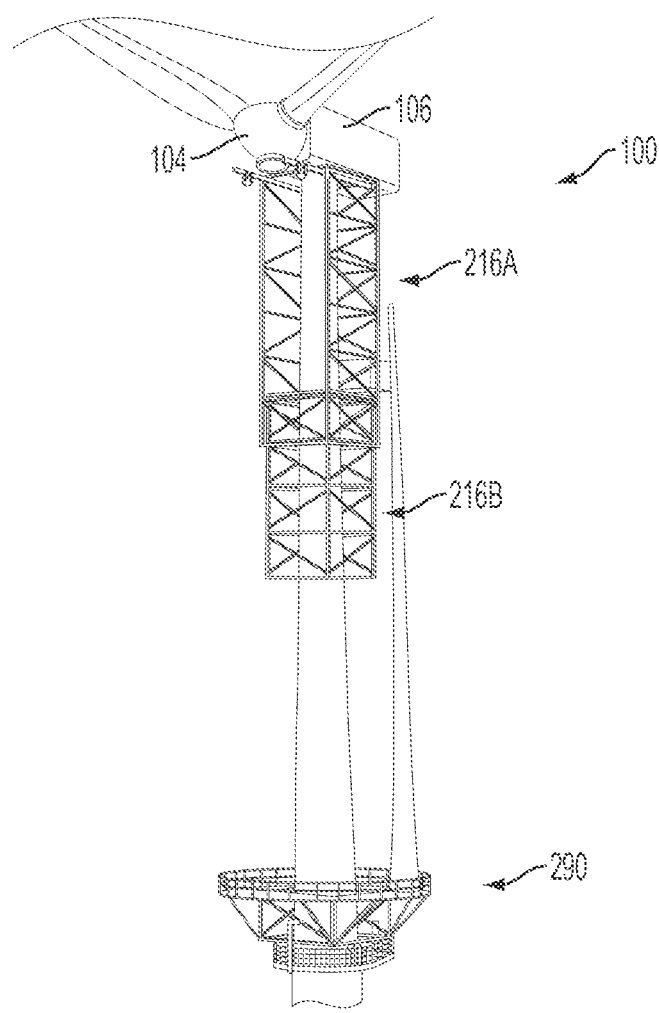

Once the frame 216B is secured to the mast, the stub column may be unsecured from the top of the mast. (Block 1048) The frame 216A may then be advanced again thereby clearing the generator and stub column from the top of the mast and raising the section insertion window 236 above the previously set mast section. (Block 1050) A new mast section may be rotated into position via the section delivery device and may be picked by the section handler and lifted into position. (Block 1052) The mast section may be set and secured, the stub mast section and generator may be rested thereon, and the frame 216B may be released and pulled within frame 216A. The process may continue until the full mast is placed as shown in FIG. 19. (Block 1054)

Figure 20:
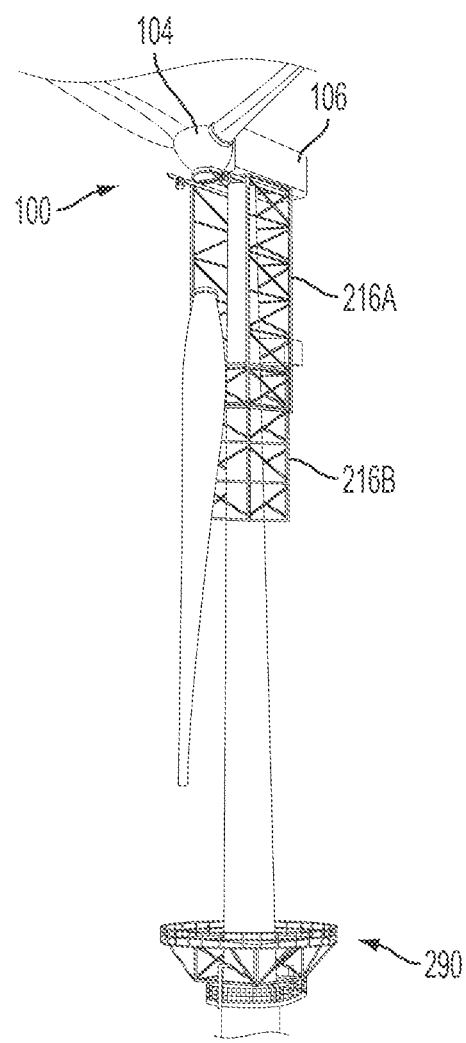
Figure 21:
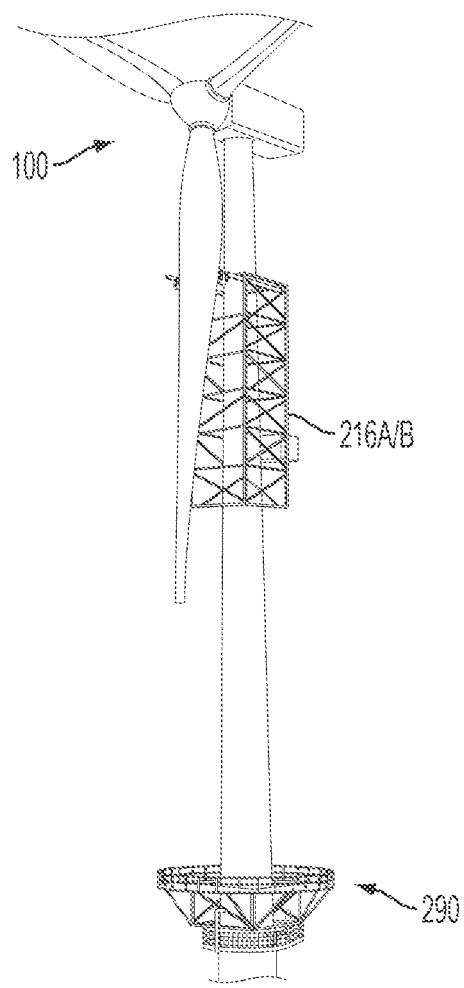

At some point in the process, an additional rotor blade may need to be lifted and secured to the rotor 104. (Block 1056) In cases where the initial mast height is insufficient to have all blades installed on the generator 100 and still have ground/water clearance, one of the blades may be left off of the generator 100 and positioned on the assembly platform as shown. When the generator 100 is lifted by the frame 216 to a height sufficient for the additional blade to clear the ground/water, the additional blade may be lifted by the winch/boom/trolley assembly and be secured to the rotor 104. This may occur at some point after sufficient clearance has been established and may occur before or after the generator 100 is secured to the top of the mast. As shown in FIGS. 19, 20, and 21, the rotor blade may be lifted and flipped via coordination of the two cables extending from the two trolleys. Once flipped, the blade may be further lifted and secured to the rotor.

Figure 22:
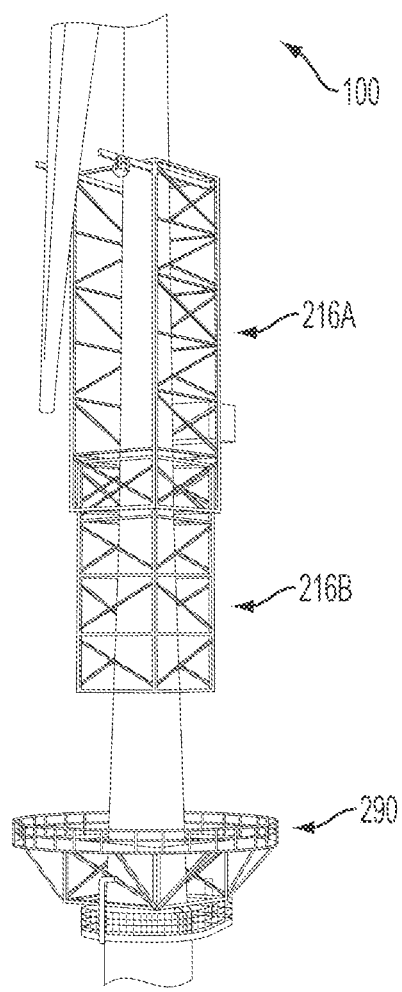
Figure 23:
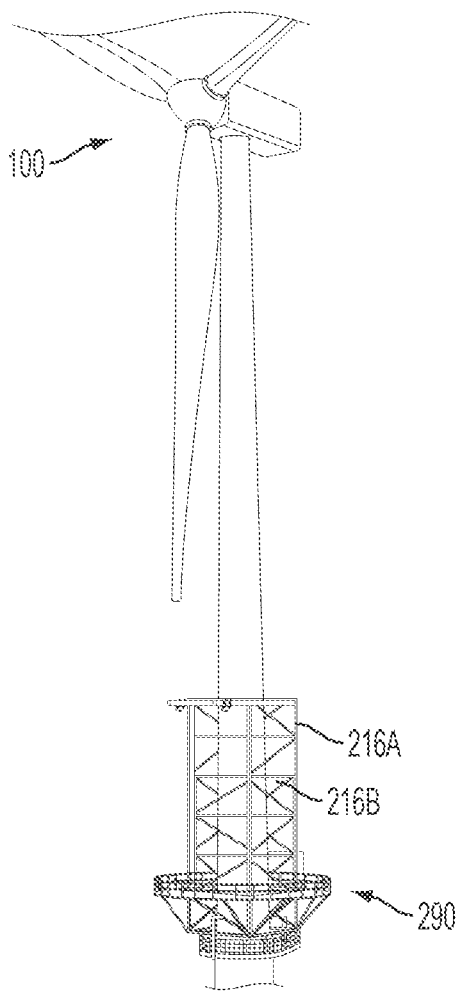
Figure 24:
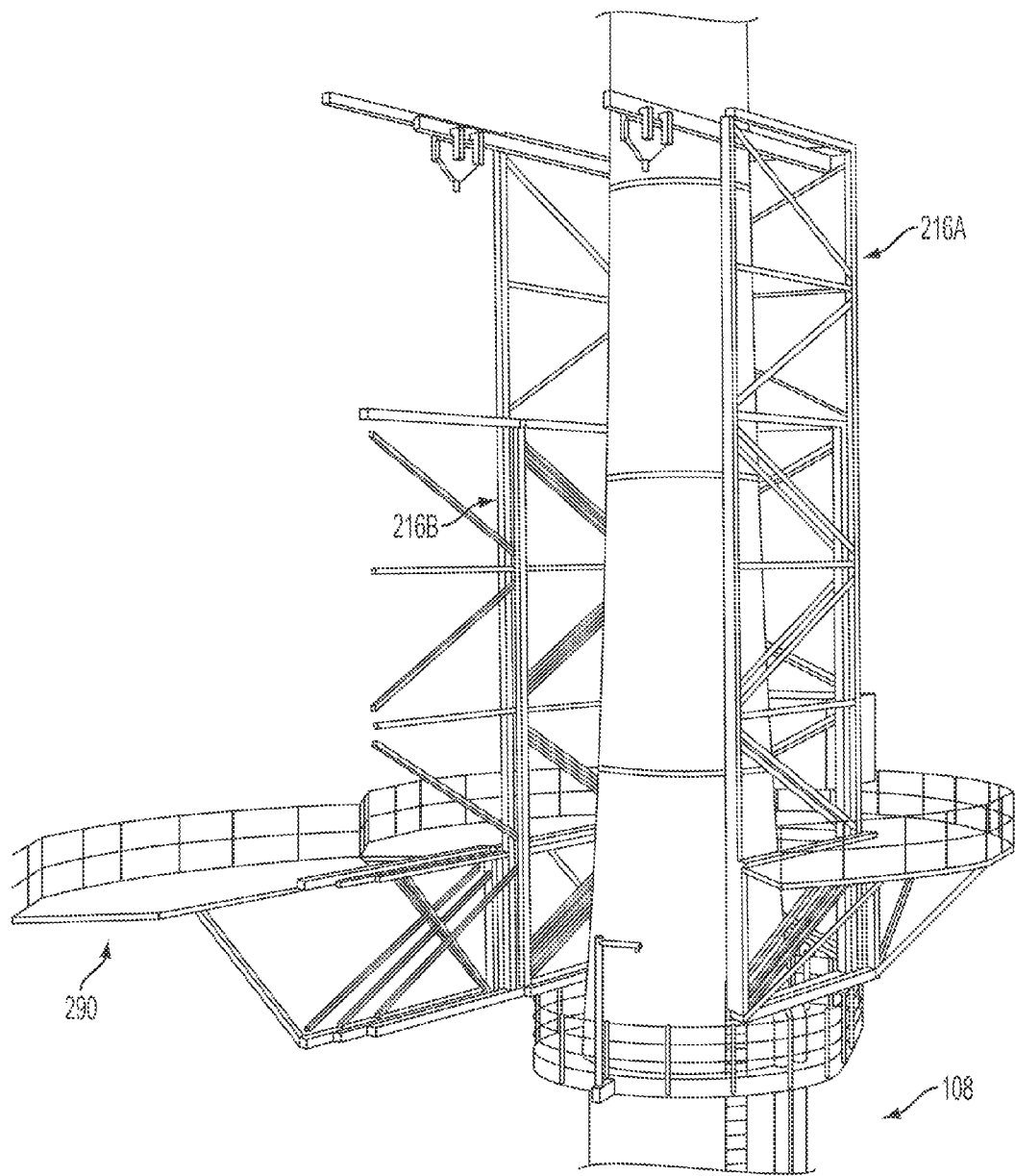
Figure 25:
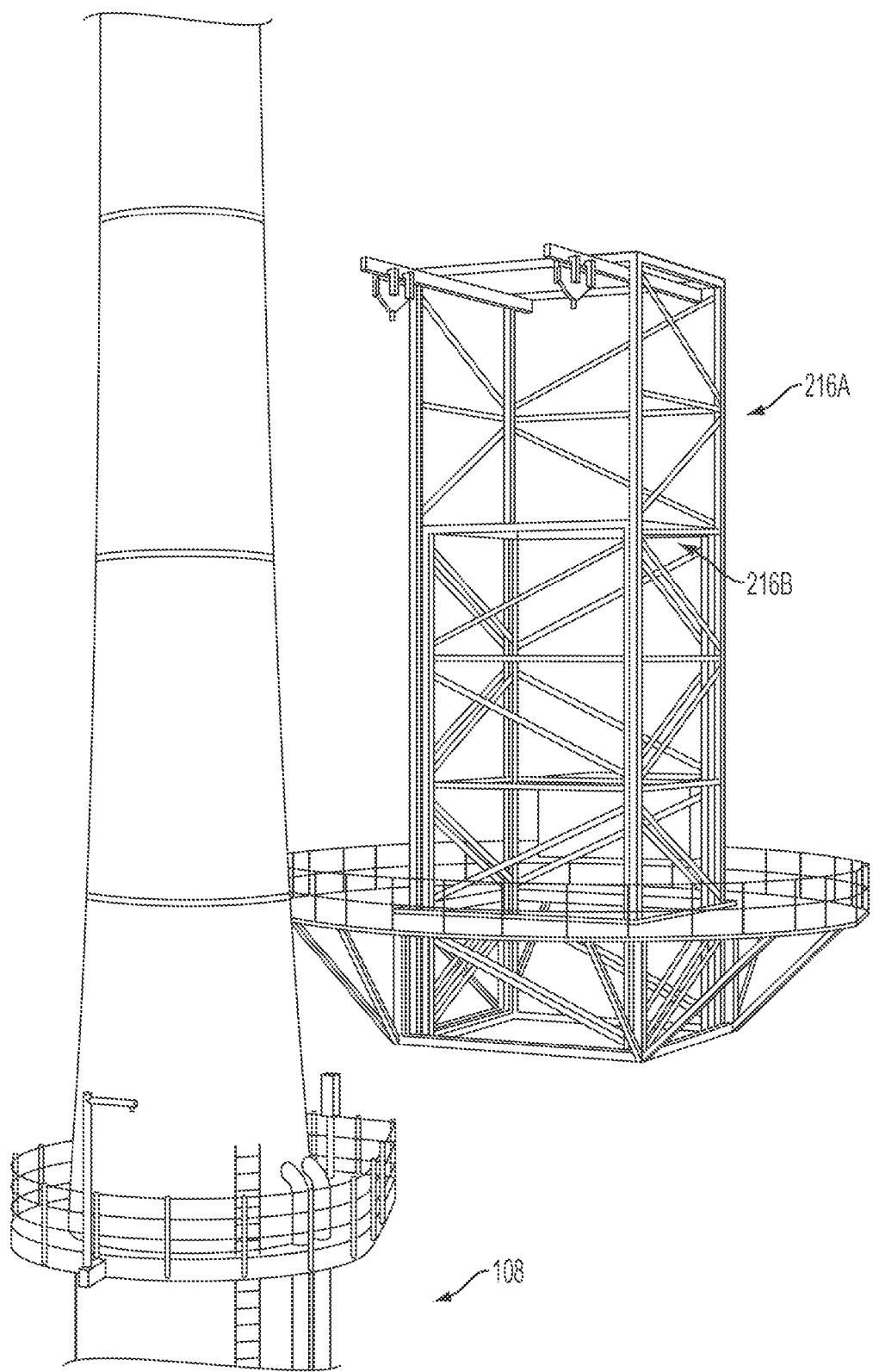

After the last mast section is set and secured, the nacelle, slew bearing, and stub mast section may be set and secured to the mast via reverse motion of the relative translation system. (Block 1058) Once set and secured, spud pins 240 of the outer frame 216A may be released from the holes 248 in the stub mast section (Block 1060) and the relative translation system may be reversed to lower the outer frame 216A relative to the inner frame 216B. (Block 1062) Once lowered, the spud pins 240 in the outer frame 216A may extend to engage holes 248 in the mast. (Block 1064) The spud pins 240 in the inner frame 216B may be released (Block 1066) and the relative translation system may be advanced to extend the inner frame 216B downward relative to the outer frame 216A. (Block 1068) The spud pins 240 of the inner frame 216B may extend to engage holes 248 and the spud pins 240 in the outer frame 216A may be released. This process may continue such that the erection apparatus 222 may climb back toward the base of the mast via alternating engagement of the spud pins 240 on the frames 216A and 216B and actuation of the relative translation device as shown in FIGS. 21, 22 and 23. (Block 1070) Upon reaching the base, the frames 216A, 216B and the assembly platform 290 may be released via their respective break systems and may be removed from the mast as shown in FIGS. 24 and 25. (Block 1072)

It is noted that the above method relies on engagement of the spud pins 240 of the outer frame 216A engaging the stub mast section. In an alternative embodiment, the generator may be mounted to the frame throughout the erection procedure and the spud pins 240 in the outer frame 216A, rather than engaging the stub mast section, may engage holes in the top of the most recent mast section that was set. In this case, once a mast section is set and secured, the outer frame 216A may be moved downward relative to the most recently set mast section to align the spud pins 240 with holes 248 near the top of the recently set section. The spud pins 240 may engage the holes 248 allowing the spud pins 240 in the inner frame 216B to be released and the inner frame drawn upward relative to the outer frame 216A. In this embodiment, the process may consistently rely on spud pin engagement to transition between movement of frames 216A and 216B and not rely on setting the stub mast section on the most recently set mast section. This may avoid having to adapt the bottom of the stub mast section for resting on varying diameter mast sections and may further allow for eliminating the use of a stub mast section. Rather, once the mast is erected, the slew bearing may be set on the top of the mast.

Alternatives. While the present disclosure includes certain particular details of an erection apparatus 122 and 222, modifications or additions to the disclosure may occur and still be within the scope of the present disclosure. For example, the trolley 140 may slide on the boom 138 rather than roll. Additionally, a different system of pulleys may be used. For example, a single pulley on the trolley 140 may be used and the trolley 140 may be equipped with a brake system or it may engage the boom 138 with a geared system. In this embodiment, the cable 144 may pass across the pulley on the trolley 140 and extend directly down to the picking location 202. The trolley 140 may be secured in position with the brake and/or gear system while the mast section is lifted adjacent to the frame window 136. The trolley 140 may then be allowed to controllably move into the frame space 130 while the winch 142 gathers the corresponding amount of cable 144.

One having ordinary skill in the art should appreciate that there are numerous types and sizes of masts for which there may be a need or desire to provide an erection apparatus. Additionally, one having ordinary skill in the art will appreciate that although the preferred embodiments illustrated herein reflect a cylindrical mast, the erection apparatus may be constructed of different materials with differing cross-sections, e.g., rectangular, triangular, oval, round, or another cross-section.

As used herein, the terms "top," "bottom," and/or other terms indicative of direction are used herein for convenience and to depict relational positions and/or directions between the parts of the embodiments. It will be appreciated that certain embodiments, or portions thereof, may also be oriented in other positions.

In addition, the term "approximately" should generally be understood to refer to both the corresponding number and a range of numbers. In addition, all numerical ranges herein should be understood to include each whole integer within the range. While illustrative embodiments of the invention are disclosed herein, it will be appreciated that numerous modifications and other embodiments may be devised by those skilled in the art. For example, the features for the various embodiments may be used in other embodiments. Therefore, it will be understood that the appended claims are intended to cover all such modifications and embodiments that come within the spirit and scope of the present invention.

What is claimed is:

1. A wind turbine system erection apparatus, comprising:
a body portion for surrounding a mast, the mast having an axis and supporting a wind turbine, the body portion having a window providing access to the axis of the mast, the body portion comprising wind turbine supporting members which support the wind turbine during erection, the wind turbine supporting members affixed about an upper end of the body portion;
a section handler secured to the body portion and extending through the window, the section handler adapted to pick, lift, axis-align, and set a mast section; and
a movement mechanism secured to the body portion, the movement mechanism adapted to moveably reposition the body portion along a length of the mast of the wind turbine system.

2. The erection apparatus of claim 1, wherein the section handler comprises:
a boom;
a trolley movably supported by the boom; and a pulley system, wherein a portion of the pulley system is suspended from the trolley.

3. The erection apparatus of claim 2, wherein the pulley system comprises:
a winch operably connected to the body portion and comprising a cable;
a first trolley pulley supported by the trolley; a second trolley pulley supported by the trolley; and
a picking pulley positioned between the first and second trolley pulley, wherein: the cable extends from the winch to a directional pulley, further to the first trolley pulley, down around the picking pulley, up around the second trolley pulley, and further to an end of the boom.

4. The erection apparatus of claim 1, wherein the movement mechanism comprises a plurality of crawling devices for engaging an outer surface of the mast.

5. The erection apparatus of claim 4, wherein the crawling devices are extendably positioned on the body portion and adapted to extend and retract relative to the body portion to accommodate varying diameters of the mast.

6. The erection apparatus of claim 5, wherein the crawling devices are further adapted to accommodate a continuously varying diameter of the mast.

7. The erection apparatus of claim 4, wherein the crawling devices include a track and the track comprises engaging saddle features adapted to engage the outer surface of the mast.

8. The erection apparatus of claim 1, wherein the body portion is adapted to open via pivoting motion to allow the body portion to be removed from the mast.

9. The erection apparatus of claim 8, wherein the body portion comprises a frame and the frame comprises a plurality of release pins on a front face and a plurality of pivot pins on a rear face, the release pins and the pivot pins defining to side faces, the frame further comprising an opener mechanism adapted to pivot the side faces of the frame about the pivot pins to separate the front face of the frame and allow it to be removed from the mast.

10. The erection apparatus of claim 1, wherein the body portion comprises at least two frames in telescoping relationship and each frame comprises a mast engaging device for securing the respective frame longitudinally relative to the mast.

11. The erection apparatus of claim 10, wherein the movement mechanism comprises a relative translation device adapted to translate the at least two frames relative to one another.

12. The erection apparatus of claim 11, wherein the relative translation device comprises a rack and pinion system.

13. The erection apparatus of claim 11, wherein the relative translation device comprises a hydraulic cylinder system.

14. The erection apparatus of claim 10, wherein the mast engaging device comprises a plurality of spud pins secured to the respective frame for engaging corresponding features in the mast.

* * * * *